United States Patent
Kim et al.

(10) Patent No.: US 9,510,340 B2
(45) Date of Patent: Nov. 29, 2016

(54) METHOD AND USER DEVICE FOR RECEIVING DOWNLINK SIGNAL, AND METHOD AND BASE STATION FOR TRANSMITTING DOWNLINK SIGNAL

(71) Applicant: LG ELECTRONICS INC., Seoul (KR)

(72) Inventors: Myoungseob Kim, Anyang-si (KR); Seungmin Lee, Anyang-si (KR); Hakseong Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 2 days.

(21) Appl. No.: 14/416,536

(22) PCT Filed: Jul. 26, 2013

(86) PCT No.: PCT/KR2013/006722
§ 371 (c)(1),
(2) Date: Jan. 22, 2015

(87) PCT Pub. No.: WO2014/017866
PCT Pub. Date: Jan. 30, 2014

(65) Prior Publication Data
US 2015/0271788 A1    Sep. 24, 2015

Related U.S. Application Data

(60) Provisional application No. 61/675,814, filed on Jul. 26, 2012, provisional application No. 61/702,241, filed on Sep. 18, 2012, provisional application No. 61/706,795, filed on Sep. 28, 2012.

(51) Int. Cl.
*H04L 1/00* (2006.01)
*H04W 72/04* (2009.01)
(Continued)

(52) U.S. Cl.
CPC .......... *H04W 72/042* (2013.01); *H04L 5/0053* (2013.01); *H04W 76/02* (2013.01);
(Continued)

(58) Field of Classification Search
CPC .................... H04W 72/0446; H04W 72/0447; H04W 72/0448; H04W 72/04; H04W 72/05; H04W 72/06; H04W 84/08; H04W 84/09; H04W 84/10
USPC .......................... 370/329, 328, 330, 338, 341
See application file for complete search history.

(56) References Cited

U.S. PATENT DOCUMENTS

2010/0279628 A1    11/2010  Love et al.
2010/0303036 A1    12/2010  McBeath et al.
(Continued)

FOREIGN PATENT DOCUMENTS

KR    10-2011-0040672 A    4/2011
KR    10-2012-0022869 A    3/2012
(Continued)

*Primary Examiner* — Dady Chery
(74) *Attorney, Agent, or Firm* — Birch, Stewart, Kolasch & Birch, LLP

(57) ABSTRACT

The present invention provides a method and a user device for receiving a downlink signal, and a method and a base station for transmitting a downlink signal. The method for a user device receiving the downlink signal in a wireless communication system, comprises: encoding downlink control channel candidates, each of which comprise at least one control channel element (CCE); and detecting the downlink control channel of the user device, wherein each of the downlink control channel candidates is encoded in accordance with a first downlink control information (DCI) format and a CCE type for the user device, or a second DCI format and a predetermined CCE type.

16 Claims, 20 Drawing Sheets

(51) Int. Cl.
*H04W 76/02* (2009.01)
*H04L 5/00* (2006.01)
*H04L 5/14* (2006.01)
*H04W 84/04* (2009.01)
*H04W 48/12* (2009.01)

(52) U.S. Cl.
CPC .......... *H04L 5/0048* (2013.01); *H04L 5/1469* (2013.01); *H04W 48/12* (2013.01); *H04W 72/0453* (2013.01); *H04W 84/042* (2013.01)

(56) References Cited

U.S. PATENT DOCUMENTS

2011/0086659 A1 4/2011 Yoon et al.
2011/0299489 A1* 12/2011 Kim ..................... H04L 1/0046
    370/329
2013/0044706 A1 2/2013 Suzuki et al.

FOREIGN PATENT DOCUMENTS

WO   WO 2010/068069 A2   6/2010
WO   WO 2011/108673 A1   9/2011

* cited by examiner

FIG. 4
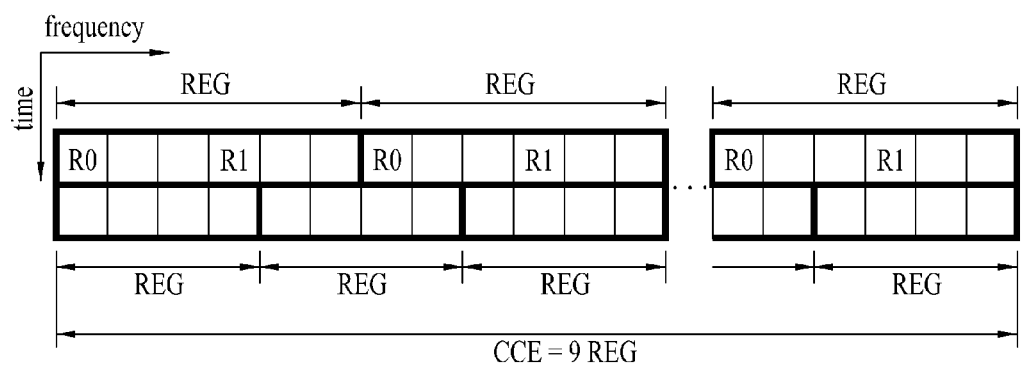
(a)
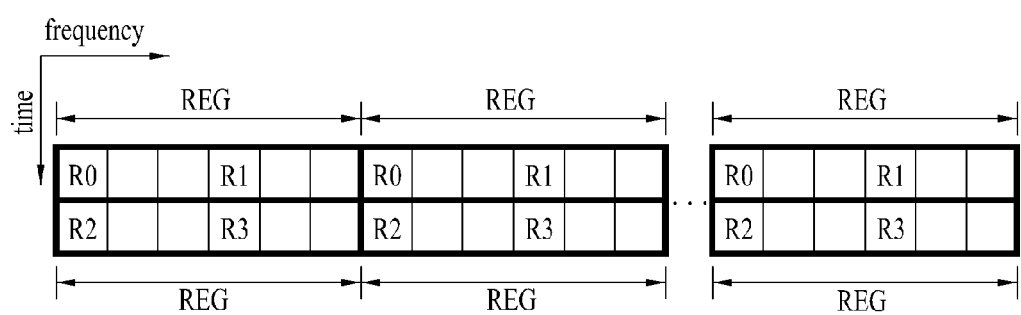
(b)

FIG. 9

|  | PRB pair #0 | PRB pair #1 | PRB pair #2 | PRB pair #3 | PRB pair #4 | PRB pair #5 | PRB pair #6 | PRB pair #7 |
|---|---|---|---|---|---|---|---|---|
| CCE index before re-indexing | 0<br>1<br>2<br>3 | 4<br>5<br>6<br>7 | 8<br>9<br>10<br>11 | 12<br>13<br>14<br>15 | 16<br>17<br>18<br>19 | 20<br>21<br>22<br>23 | 24<br>25<br>26<br>27 | 28<br>29<br>30<br>31 |
| CCE index after re-indexing | 0<br>8<br>16<br>24 | 1<br>9<br>17<br>25 | 2<br>10<br>18<br>26 | 3<br>11<br>19<br>27 | 4<br>12<br>20<br>28 | 5<br>13<br>21<br>29 | 6<br>14<br>22<br>30 | 7<br>15<br>23<br>31 |

FIG. 19
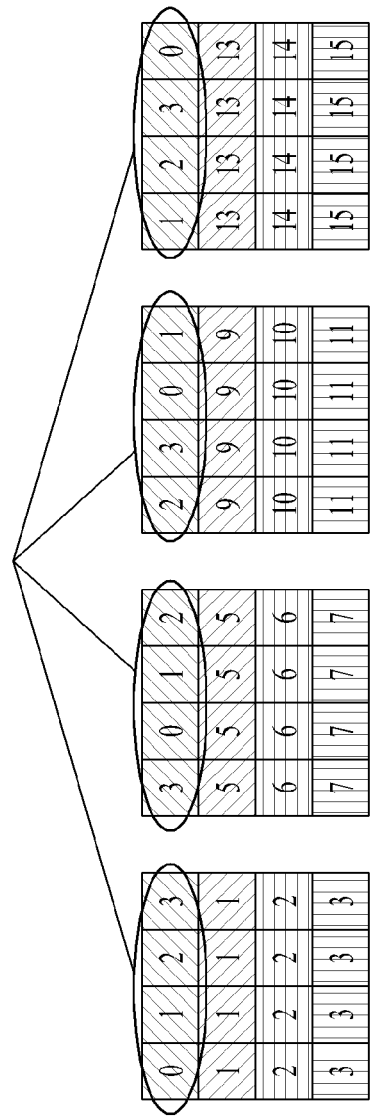
(a)
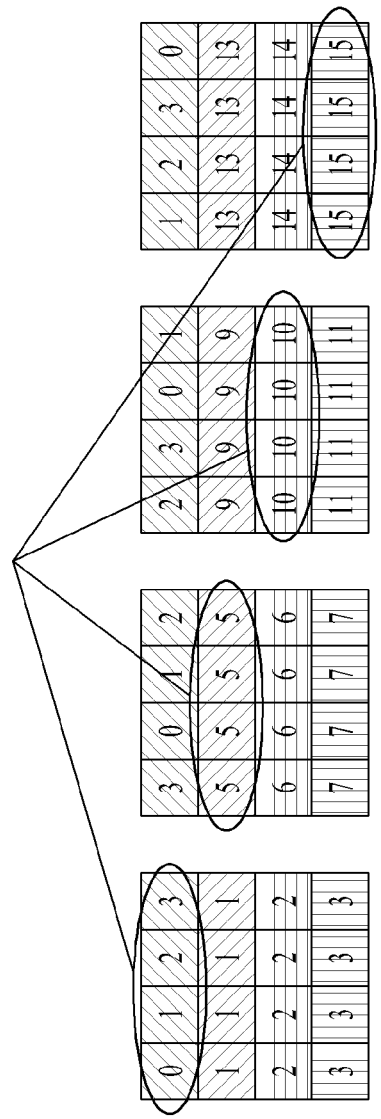
(b)

METHOD AND USER DEVICE FOR RECEIVING DOWNLINK SIGNAL, AND METHOD AND BASE STATION FOR TRANSMITTING DOWNLINK SIGNAL

CROSS REFERENCE TO RELATED APPLICATIONS

This application is the National Phase of PCT International Application No. PCT/KR2013/006722, filed on Jul. 26, 2013, which claims priority under 35 U.S.C. 119(e) to U.S. Provisional Application No. 61/675,814 filed on Jul. 26, 2012, 61/702,241 filed on Sep. 18, 2012 and 61/706,795 filed on Sep. 28, 2012, all of which are hereby expressly incorporated by reference into the present application.

TECHNICAL FIELD

The present invention relates to a wireless communication system and, more particularly, to a method for transmitting or receiving a downlink signal and an apparatus therefor.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DETAILED DESCRIPTION OF THE INVENTION

Technical Problems

Due to introduction of new radio communication technology, the number of user equipments (UEs) to which an eNB should provide a service in a prescribed resource region increases and the amount of data and control information that the BS should transmit to the UEs increases. Since the amount of resources available to the BS for communication with the UE(s) is limited, a new method in which the BS efficiently transmits downlink control information using the limited radio resources is needed.

Accordingly, the present invention provides a method and apparatus for efficiently transmitting/receiving downlink control information.

The technical objects that can be achieved through the present invention are not limited to what has been particularly described hereinabove and other technical objects not described herein will be more clearly understood by persons skilled in the art from the following detailed description.

Technical Solutions

In an aspect of the present invention, provided herein is a method for receiving a downlink signal by a user equipment in a wireless communication system, comprising detecting a downlink control channel of the user equipment by decoding downlink control channel candidates, each of the downlink control channel candidates including one or more control channel elements (CCEs). Each of the downlink control channel candidates may be decoded according to a first downlink control information (DCI) format corresponding a transmission mode for the user equipment and a CCE type for the user equipment or according to a predefined second DCI format and a predefined CCE type. In another aspect of the present invention, provided herein is a user equipment for receiving a downlink signal in a wireless communication system, comprising a processor configured to detect a downlink control channel of the user equipment by decoding downlink control channel candidates, each of the downlink control channel candidates including one or more control channel elements (CCEs). Each of the downlink control channel candidates may be decoded according to a first downlink control information (DCI) format corresponding a transmission mode for the user equipment and a CCE type for the user equipment or according to a predefined second DCI format and a predefined CCE type.

In still another aspect of the present invention, provided herein is a method for transmitting a downlink signal by a base station in a wireless communication system, comprising: selecting one of downlink control candidates as a downlink control channel of a user equipment, each of the downlink control channel candidates including one or more control channel elements (CCEs); and transmitting downlink control information (DCI) to the user equipment over the downlink control channel. The DCI may be configured according to a first DCI format corresponding to a transmission mode for the user equipment or a predefined second DCI format. When the DCI is configured according to the first DCI format, the downlink control channel may include one or more CCEs of a CCE type for the user equipment and when the DCI is configured according to the second DCI format, the downlink control channel may include one or more CCEs of a predefined CCE type.

In an aspect of the present invention, provided herein is a base station for transmitting a downlink signal in a wireless communication system, comprising a radio frequency (RF) unit and a processor configured to control the RF unit, wherein the processor selects one of downlink control candidates as a downlink control channel of a user equipment, each of the downlink control channel candidates including one or more control channel elements (CCEs), and controls the RF unit to transmit downlink control information (DCI) to the user equipment over the downlink control channel. The processor may configure the DCI according to a first DCI format corresponding to a transmission mode for the user equipment or a predefined second DCI format. When the DCI is configured according to the first DCI format, the processor may configure the downlink control channel using one or more CCEs of a CCE type for the user equipment and when the DCI is configured according to the second DCI format, the processor may configure the downlink control channel using one or more CCEs of a predefined CCE type.

In each aspect of the present invention, the predefined CCE type may be one of a localized CCE composed of resources from the same physical resource block (PRB) pair and a distributed CCE composed of resources from two or more different PRB pairs.

In each aspect of the present invention, the predefined CCE type may be the distributed CCE regardless of the transmission mode.

In each aspect of the present invention, information indicating the CCE type for the user equipment may be transmitted to the user equipment.

The above technical solutions are merely some parts of the embodiments of the present invention and various embodiments into which the technical features of the present invention are incorporated can be derived and understood by persons skilled in the art from the following detailed description of the present invention.

Advantageous Effect

According to the present invention, downlink control information can be efficiently transmitted/received and thus overall throughput of a wireless communication system is raised.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 4 illustrates resource units used for configuring a downlink control channel in a 3GPP (3$^{rd}$ Generation Partnership Project) LTE (Long Term Evolution)/LTE-A (Advanced) system.

FIG. 9 illustrates a method for indexing ECCEs.

FIG. 11 illustrates an example of determining schemes for multiplexing an L-ECCE and a D-ECCE and then determining a starting position of an EPDCCH candidate in a search space according to an embodiment of the present invention.

FIGS. 16 and 17 illustrate mapping of a distributed ECCE to an enhanced reference element group (EREG) according to an embodiment of the present invention.

FIG. 19 illustrates an example of placing a localized EPDCCH in an EPDCCH set according to an embodiment of the present invention.

MODE FOR CARRYING OUT THE INVENTION

Figure 1:
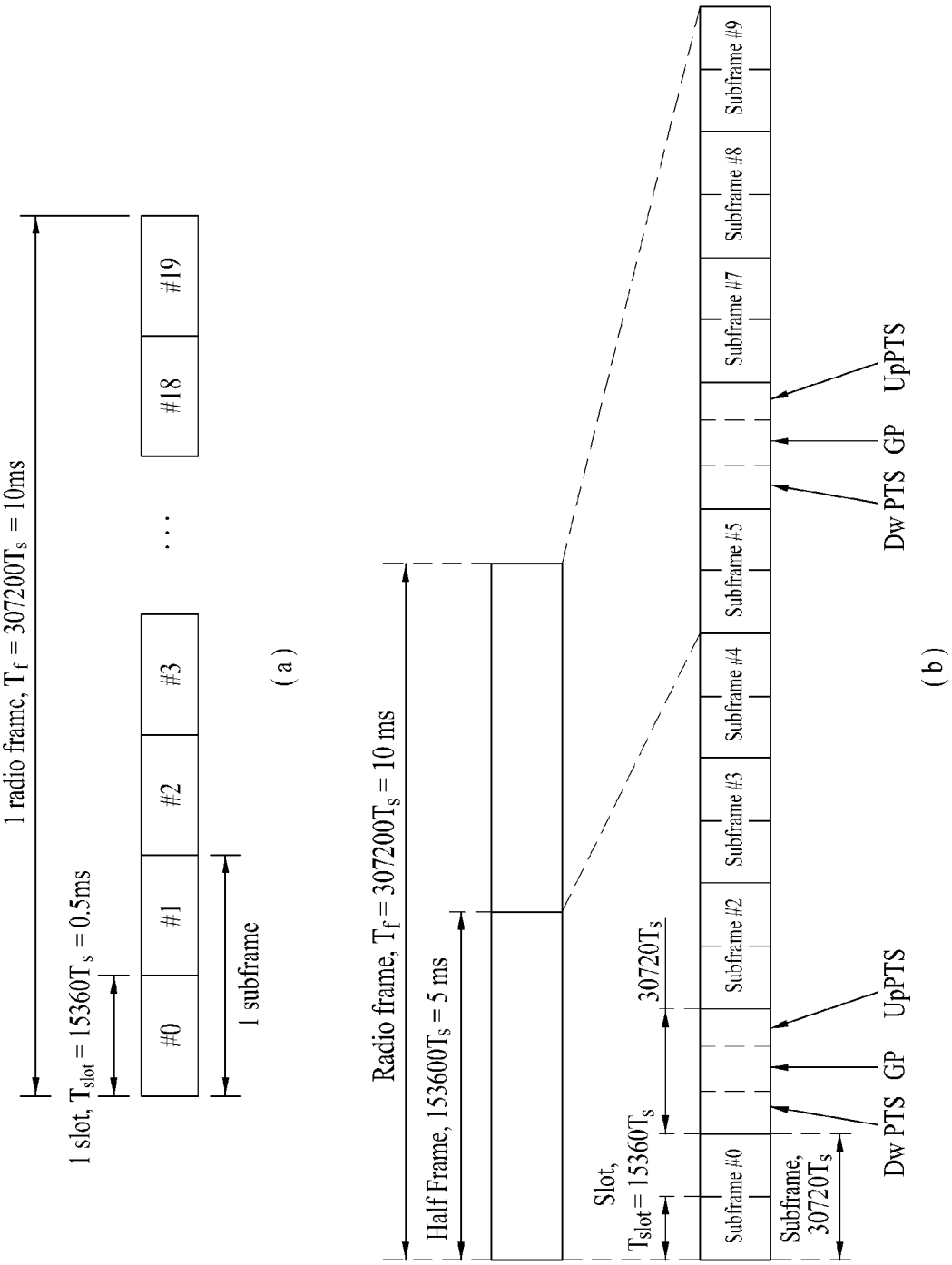
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AR whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk" A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point. In the multi-node system, the same cell identity (ID) or different cell IDs may be used to transmit/receive signals to/from a plurality of nodes. If the plural nodes have the same cell ID, each of the nodes operates as a partial antenna group of one cell. If the nodes have different cell IDs in the multi-node system, the multi-node system may be regarded as a multi-cell (e.g. a macro-cell/femto-cell/pico-cell) system. If multiple cells formed respectively by multiple nodes are configured in an overlaid form according to coverage, a network formed by the multiple cells is referred to as a multi-tier network. A cell ID of an RRH/RRU may be the same as or different from a cell ID of an eNB. When the RRH/RRU and the eNB use different cell IDs, both the RRH/RRU and the eNB operate as independent eNBs.

In the multi-node system, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g. a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via a plurality of transmit (Tx)/receive (Rx) nodes, signals are transmitted/received via at least one node selected from a plurality of Tx/Rx nodes, or a node transmitting a DL signal is discriminated from a node transmitting a UL signal is called multi-eNB MIMO or coordinated multi-point transmission/reception (CoMP). Coordinated transmission schemes from among CoMP communication schemes may be broadly categorized into joint processing (JP) and scheduling coordination. The former may be divided into joint transmission (JT)/joint reception (JR) and dynamic point selection (DPS) and the latter may be divided into coordinated scheduling (CS) and coordinated beamforming (CB). DPS may be called dynamic cell selection (DCS). When JP is performed, a wider variety of communication environments can be formed, compared to other CoMP schemes. JT refers to a communication scheme by which a plurality of nodes transmits the same stream to a UE and JR refers to a communication scheme by which a plurality of nodes receive the same stream from the UE. The UE/eNB combine signals received from the plurality of nodes to restore the stream. In the case of JT/JR, signal transmission reliability can be improved according to transmit diversity since the same stream is transmitted to/from a plurality of nodes. In JP, DPS refers to a communication scheme by which a signal is transmitted/received through a node selected from a plurality of nodes according to a specific rule. In the case of DPS, signal transmission reliability can be improved because a node having a good channel state between the node and the UE is selected as a communication node.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. An interfering cell refers to a cell interfering with a specific cell. Namely, if a signal of a neighboring cell interferes with a signal of a specific cell, the neighboring cell becomes an interfering cell with respect to the specific cell and the specific cell becomes a victim cell with respect to the neighboring cell. If neighboring cells interfere with each other or unilaterally, such interference is referred to as inter-cell interference (ICI). The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. The "cell" of the radio resource will be described in detail when carrier aggregation is described.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a HE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS is assigned or configured will be referred to as CRS/DMRS/CSI-RS/SRS/UE-RS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS ports may also be used to indicate a pattern of REs occupied by CRSs/UE-RSs/CSI-RSs in a predetermined resource region.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz$)$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
|---|---|---|---|---|---|---|
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
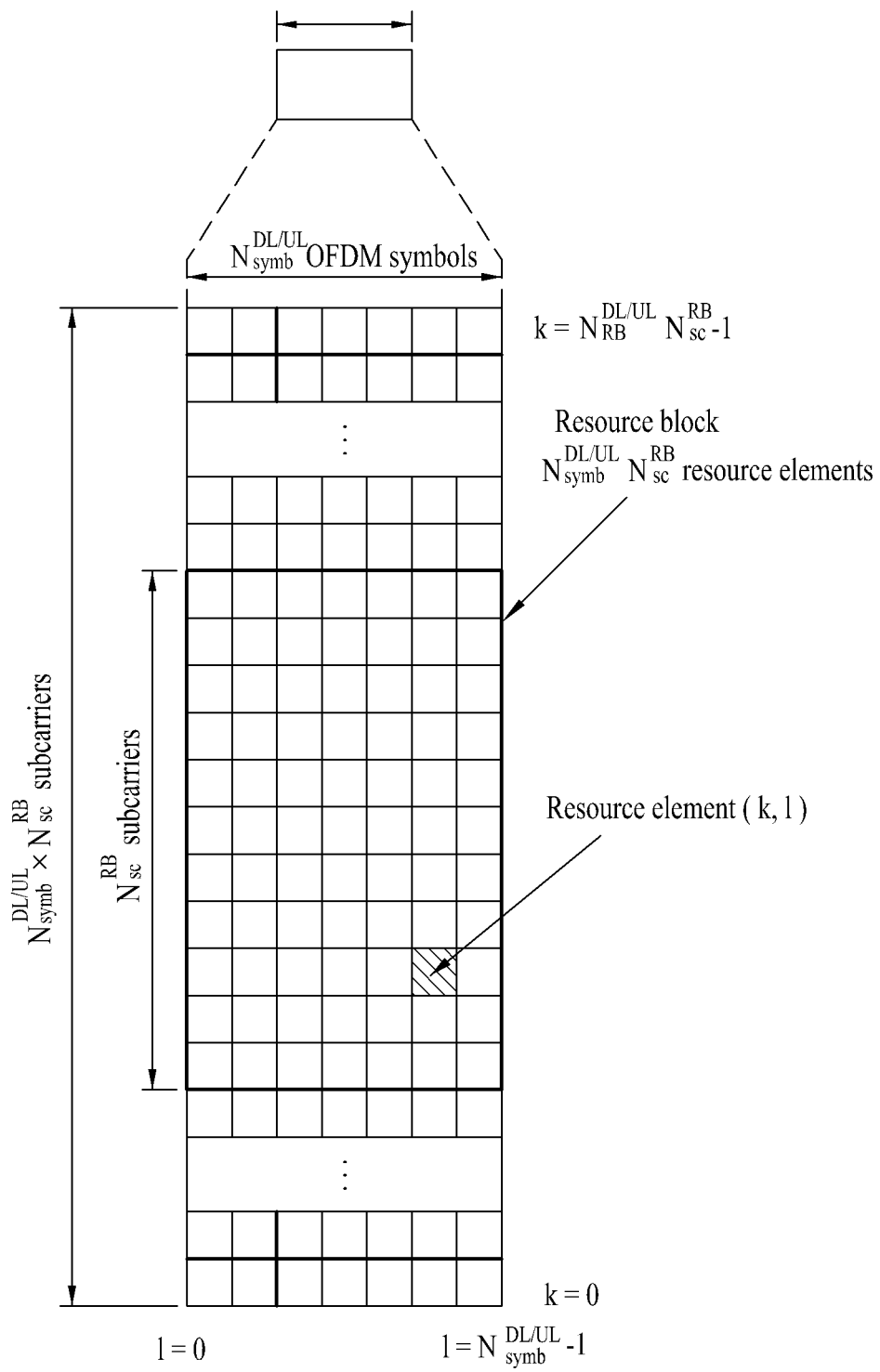
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} - 1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb} * N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
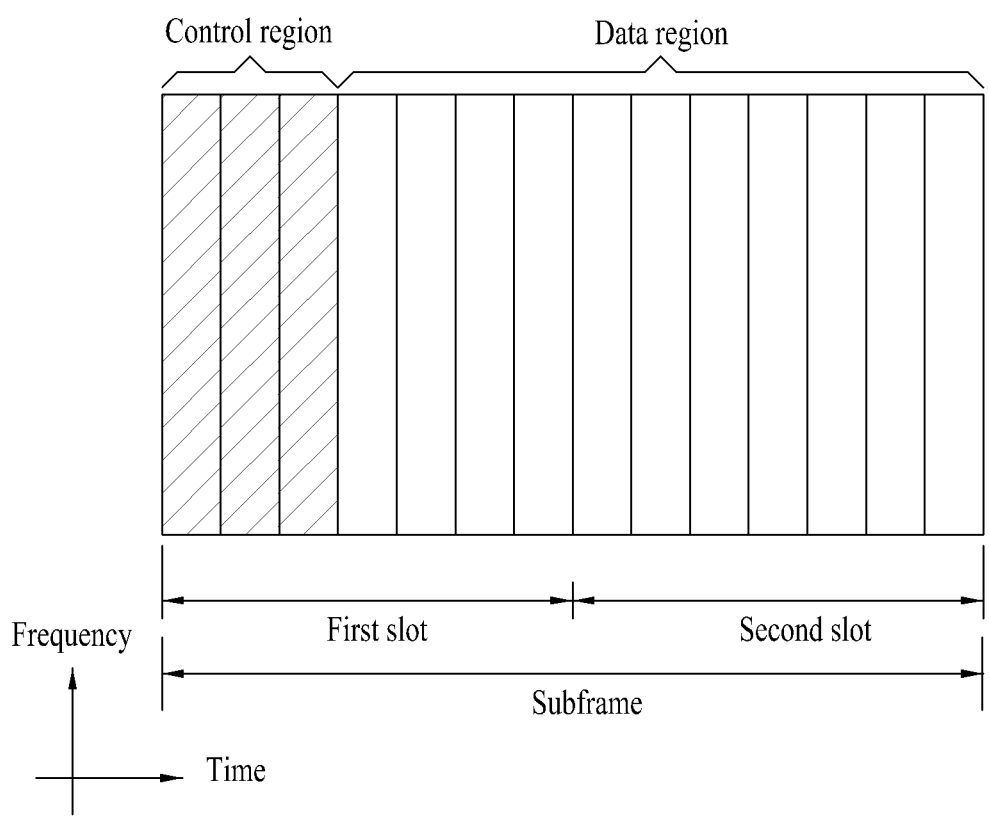
FIG. 3 illustrates the structure of a DL subframe used in a wireless communication system.

FIG. 3 illustrates the structure of a DL subframe used in a wireless communication system.

A DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI. Table 3 illustrates an example of the DCI format.

TABLE 3

| DCI format | Description |
| --- | --- |
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact signaling of resource assignments for single codeword PDSCH |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |
| 2B | Resource assignments for PDSCH using up to 2 antenna ports with UE-specific reference signals |
| 2C | Resource assignment for PDSCH using up to 8 antenna ports with UE-specific reference signals |
| 3/3A | Power control commands for PUCCH and PUSCH with 2-bit/1-bit power adjustments |
| 4 | Scheduling of PUSCH in one UL Component Carrier with multi-antenna port transmission mode |

In Table 3, format 0 and 4 are DCI formats defined for UL and formats 1, 1A, 1B, 1C, 1D, 2, 2A, 2B, 2C, 3 and 3A are DCI formats for DL. In addition to the above formats, various formats may be defined.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

FIG. 4 illustrates resource units used for configuring a DL control channel in an LTE/LTE-A system. Especially, FIG. 4(a) illustrates the case in which the number of transmit antennas of an eNB is 1 or 2 and FIG. 4(b) illustrates the case in which the number of transmit antennas of an eNB is 4.

Only reference signal (RS) REs differs according to the number of antennas configured by the eNB for transmission of RS(s) and the following resource configuration method for a DL control channel may be identically applied even when the number of antennas varies.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs).

Referring to FIG. 4, for example, one CCE corresponds to nine resource element groups (REGs), and one REG corresponds to four REs. Four QPSK symbols are mapped into each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH). For example, a PCFICH and a PHICH include 4 REGs and 3 REGs, respectively. If the number of REGs not allocated to the PCFICH or the PHICH is $N_{REG}$, CCEs in a DL subframe usable for PDCCH(s) in a system are numbered from 0 to $N_{CCE}-1$ where $N_{CCE}$ floor($N_{REG}/9$).

The number of DCI formats and DCI bits is determined in accordance with the number of CCEs. The following table shows supported PDCCH formats, the number of CCEs per format, and the supported number of DCI bits per format.

TABLE 4

| PDCCH format | Number of CCEs | Number of resource-element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

CCEs are numbered and used consecutively. In order to simplify a decoding process, the PDCCH having a format that includes n number of CCEs may only start on a CCE fulfilling a CCE number corresponding to a multiple of n. For example, a PDCCH composed of n consecutive CCEs PDCCH may be started on only a CCE satisfying 'i mod n=0' where i is a CCE index (or CCE number).

The number of CCEs used for transmission of a specific PDCCH is determined by the BS in accordance with a channel status. For example, one CCE may be required for a PDCCH for a UE (for example, adjacent to BS) having a good downlink channel. However, in case of a PDCCH for a UE (for example, located near the cell edge) having a poor channel, eight CCEs may be required to obtain sufficient robustness. In addition, a power level of the PDCCH may be adjusted to correspond to a channel status.

In a 3GPP LTE/LTE-A system, a CCE set in which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. SSs for respective PDCCH formats may have different sizes and a dedicated SS and a common SS are defined. The dedicated SS is a UE-specific SS (USS) and is configured for each individual UE. The common SS (CSS) is configured for a plurality of UEs. The following table shows aggregation levels for defining SSs.

TABLE 5

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

For the common search spaces, $Y_k$ is set to 0 for the aggregation levels L=4 and L=8. For the UE SS $S^{(L)}_k$ at aggregation level L, the variable $Y_k$ is defined by the following equation.

$$Y_k = (A \cdot Y_{k-1}) \bmod D \quad \text{[Equation 1]}$$

In Equation 1, $Y_{-1} = n_{RNTI}$, A=39827, D=65537 and $k = \lfloor n_s/2 \rfloor$, $n_s$ is the slot number within a radio frame. SI-RNTI, C-RNTI, P-RNTI, RA-RNTI and etc. may be used as an RNTI for $n_{RNTI}$.

For each serving cell on which PDCCH is monitored, the CCEs corresponding to PDCCH candidate m of the search space $S^{(L)}_k$ are given by the following equation.

$$L\{(Y_k + m') \bmod \lfloor N_{CCE,k}/L \rfloor\} + i \quad \text{[Equation 2]}$$

In Equation 2, $Y_k$ may be defined by Equation 12, i=0, . . . , L−1. For the common search space, m'=m. For the UE SS, for the serving cell on which PDCCH is monitored, if the monitoring UE is configured with carrier indicator field, for example, if a upper layer informs the UE of the existence of the carrier indicator field, then $m' = m + M^{(L)} \cdot n_{CI}$ where $n_{CI}$ is the carrier indicator field value. The carrier indicator field value is the same as a serving cell index (ServCellIndex) of a corresponding serving cell. The serving cell index is a short ID used to identify a serving cell and, for example, any one of integers from 0 to 'maximum number of carrier frequencies which can be configured for the UE at a time minus 1' may be allocated to one serving cell as the serving cell index. That is, the serving cell index may be a logical index used to identify a specific serving cell among cells allocated to the UE rather than a physical index used to identify a specific carrier frequency among all carrier frequencies. In the meantime, if the monitoring UE is not configured with carrier indicator field (CIF) then m'=m, where m'=0, . . . , $M^{(L)}$−1. $M^{(L)}$ is the number of PDCCH candidates to monitor in the given search space. That is, in order to confirm whether a PDCCH composed of L CCEs is transmitted to the UE, the UE is configured to check $M^{(L)} (\geq L)$ consecutive CCE(s) or CCE(s) arranged according to a specific rule. For reference, the CIF is included in DCI and, in carrier aggregation, the CIF is used to indicate for which cell the DCI carries scheduling information. An eNB may inform the UE of whether the DCI received by the UE is capable of including the CIF through a higher layer signal. That is, the UE may be configured with the CIF by a higher layer. Carrier aggregation will be described later.

An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) "A" and information about data transmitted using a radio resource "B" (e.g. frequency location) and using transport format information "C" (e.g. transmission block size, modulation scheme, coding information, etc.) is transmitted in a specific DL subframe. Then, the UE monitors the PDCCH using RNTI information thereof. The UE having the RNTI "A" receives the PDCCH and receives the PDSCH indicated by "B" and "C" through information of the received PDCCH.

Generally, a DCI format capable of being transmitted to a UE differs according to a transmission mode (TM) configured for the UE. In other words, for the UE configured for a specific TM, only some DCI format(s) corresponding to the specific TM rather than all DCI formats may be used. For example, the UE is semi-statically configured by higher layers so as to receive PDSCH data signaled through a PDCCH according to one of a plurality of predefined TMs. To maintain operation load of the UE according to blind decoding attempt at a predetermined level or less, all DCI formats are not always simultaneously searched by the UE. Table 6 illustrates a transmission mode for configuring multi-antenna technology and a DCI format where the UE performs blind decoding in accordance with the corresponding transmission mode. In particular, Table 6 illustrates a relation between PDSCH and PDCCH configured by C-RNTI.

TABLE 6

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
| | DCI format 1 | UE specific by C-RNTI | Single-antenna port, port 0 |
| Mode 2 | DCI format 1A | Common and UE specific by C-RNTI | Transmit diversity |
| | DCI format 1 | UE specific by C-RNTI | Transmit diversity |
| Mode 3 | DCI format 1A | Common and UE specific by C-RNTI | Transmit diversity |
| | DCI format 2A | UE specific by C-RNTI | Large delay CDD or Transmit diversity |
| Mode 4 | DCI format 1A | Common and UE specific by C-RNTI | Transmit diversity |
| | DCI format 2 | UE specific by C-RNTI | Closed-loop spatial multiplexing or Transmit diversity |

TABLE 6-continued

| Transmission mode | DCI format | Search Space | Transmission scheme of PDSCH corresponding to PDCCH |
|---|---|---|---|
| Mode 5 | DCI format 1A | Common and UE specific by C-RNTI | Transmit diversity |
|  | DCI format 1D | UE specific by C-RNTI | Multi-user MIMO |
| Mode 6 | DCI format 1A | Common and UE specific by C-RNTI | Transmit diversity |
|  | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |
|  | DCI format 2C | UE specific by C-RNTI | Up to 8 layer transmission, ports 7-1 |

Although TMs 1 to 9 are shown in Table 6, other TMs as well as the TMs defined in Table 6 may be defined.

Referring to Table 6, the UE configured to decode the PDCCH with CRC scrambled in C-RNTI by an upper layer decodes the PDCCH and also decodes the corresponding PDSCH in accordance with each combination defined in Table 6. For example, if the UE is configured in a transmission mode 1 by upper layer signaling, the UE acquires DCI of DCI format 1A or DCI of DCI format 1 by respectively trying to decode the PDCCH with the DCI formats 1A and 1. For reference, it can be appreciated that DCI format 1A in Table 6 corresponds to every TM. Such a DCI format configured regardless of a TM is referred to as a DCI format for fallback and a DCI format specific to the TM is referred to as a DCI format for the TM. For example, among DCI formats corresponding to TM 1, DCI format 1A may be the DCI format for fallback and DCI format 1 may be the DCI format for the TM.

Figure 5:
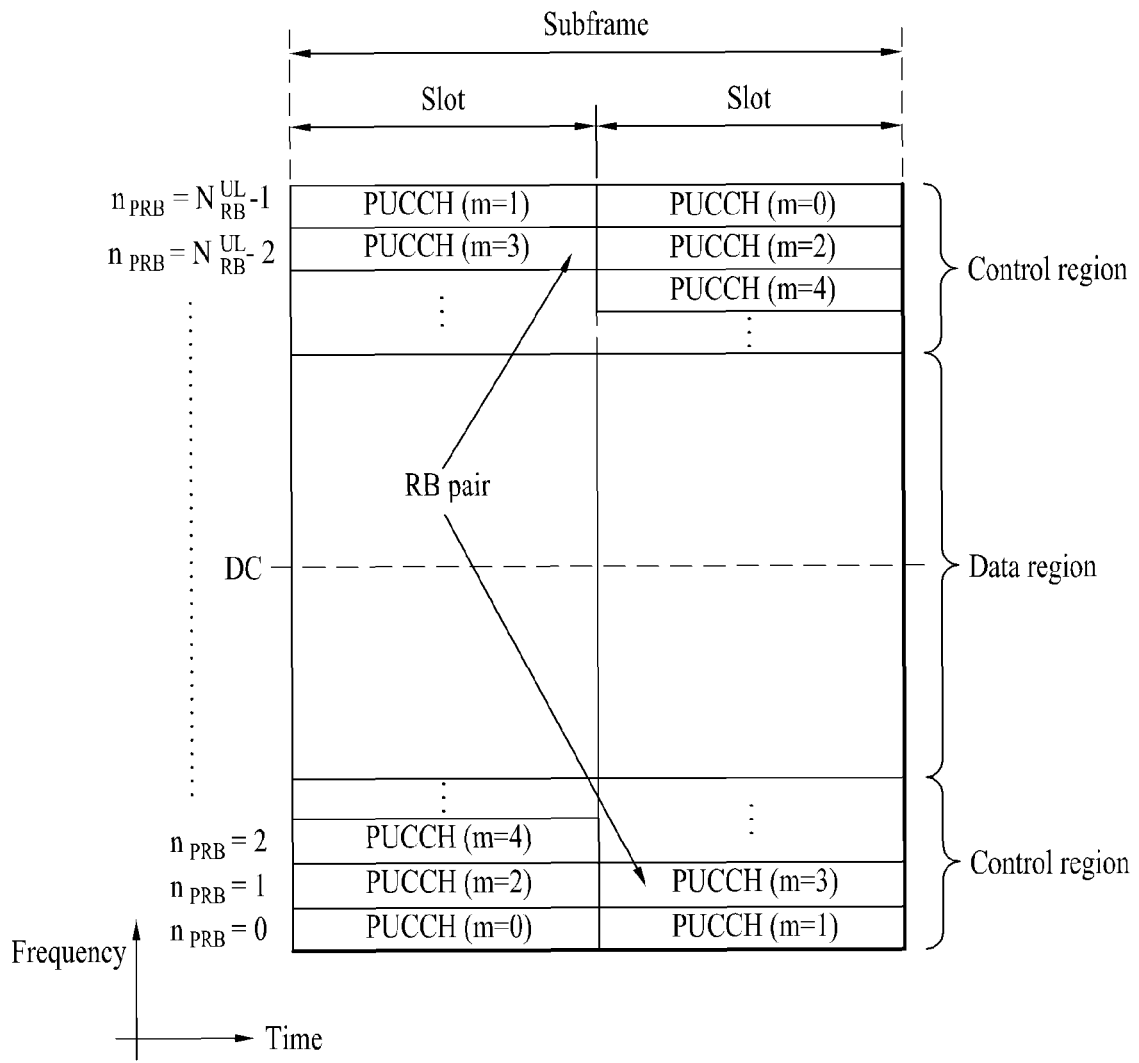
FIG. 5 illustrates the structure of a UL subframe used in a wireless communication system.

FIG. 5 illustrates the structure of a UL subframe used in a wireless communication system.

Referring to FIG. 5, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission bandwidth are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DTX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, multiple input multiple output (MIMO)-related feedback information includes the RI and the PMI. The RI indicates the number of streams or the number of layers that the UE can receive through the same time-frequency resource. The PMI is a value reflecting a space characteristic of a channel, indicating an index of a precoding matrix preferred by a UE for DL signal transmission based on a metric such as an SINR. The CQI is a value of channel strength, indicating a received SINR that can be obtained by the UE generally when an eNB uses the PMI.

A general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC). For example, three 20 MHz CCs in each of UL and DL are aggregated to support a BW of 60 MHz. The CCs may be contiguous or non-contiguous in the frequency domain. Although FIG. 10(b) illustrates that a BW of UL CC and a BW of DL CC are the same and are symmetrical, a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE.

In the meantime, the 3GPP LTE-A system uses a concept of cell to manage radio resources. The cell is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is full reconfigured will be referred to as Pcell, and a cell which may be activated/deactivated freely by the eNB will be referred to as Scell. The Pcell and the Scell may be identified from each other on the basis of the control information. For example, specific control information may be set to be transmitted and received through a specific cell only. This specific cell may be referred to as the Pcell, and the other cell(s) may be referred to as Scell(s).

The configured cell for the UE may be a serving cell in terms of the UE. The configured cell for the UE, i.e. the serving cell, preserves resources for ACK/NACK transmission for PDSCH transmission. An activated cell refers to a cell configured to be actually used for PDSCH/PUSCH transmission among configured cells for the UE and CSI reporting and SRS transmission for PDSCH/PUSCH transmission are performed on the activated cell. A deactivated cell refers to a cell configured not to be used for PDSCH/PUSCH transmission by the command of an eNB or the operation of a timer and CSI reporting and SRS transmission are stopped on the deactivated cell. In order to distinguish between serving cell(s), serving cell indexes may be used. For example, any one of integers from 0 to 'maximum number of carrier frequencies which can be configured for the UE at a time minus 1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term cell used in CA is distinguished from the term cell referring to a prescribed geographic region to which a communication service is provided by one eNB or one antenna group. To distinguish between a cell indicating a prescribed geographic region and a cell of CA, in the present invention, the cell of CA is referred to as a CC and the cell of a geographic region is referred to as a cell.

In a CA situation, a plurality of serving CCs may be configured for one UE. A scheme performed by a control channel for scheduling a data channel can be divided into existing linked carrier scheduling and cross carrier scheduling. In link carrier scheduling, a control channel transmitted on a specific CC schedules only a data channel which is to be transmitted or received on the specific CC. In contrast, in cross carrier scheduling, a serving CC having a good channel state may be used to transmit a UL/DL grant for another serving CC. In cross carrier scheduling, a CC on which a UL/DL grant which is scheduling information is transmitted may be different from a CC on which UL/DL transmission corresponding to the UL/DL grant is performed. In cross carrier scheduling, a control channel schedules, using a carrier indicator field (CIF) in DCI, a data channel transmitted on a CC different from a CC on which a PDCCH carrying the DCI is configured.

If RRH technology, cross carrier scheduling technology, etc. are introduced, the amount of PDCCHs that an eNB should transmit is gradually increased. However, since the size of a control region to which the PDCCHs are capable of being transmitted is invariant, transmission of the PDCCHs serves as a bottleneck of system performance. Although channel quality can be improved by introduction of the above-described multi-node system and application of various communication schemes, introduction of a new control channel has been demanded in order to apply an existing communication scheme and carrier aggregation technology to a multi-node environment. Due to this necessity, configuring the new control channel in a data region (hereinafter, a PDSCH region) rather than an existing control region (hereinafter, a PDCCH region) has been discussed. Hereinafter, the new control channel will be referred to as an enhanced PDCCH (EPDCCH). Using the EPDCCH enables transmission of control information per node to the UE and also can solve shortage of the existing PDCCH region. For reference, a PDCCH is transmitted through the same antenna port(s) as antenna port(s) configured for transmission of a CRS and the UE configured to decode the PDCCH may demodulate or decode the PDCCH using the CRS. In contrast, the EPDCCH is a channel introduced in consideration of a new communication technique or a new communication environment. The EPDCCH is transmitted together with a DMRS transmitted on a predetermined resource on which the EPDCCH is configured and the UE configured to decode the EPDCCH demodulates the EPDCCH using the DMRS. For reference, demodulation may be understood as the meaning of a part of a decoding process and, in the present invention, the term decoding may be used instead of the term demodulation.

Figure 6:
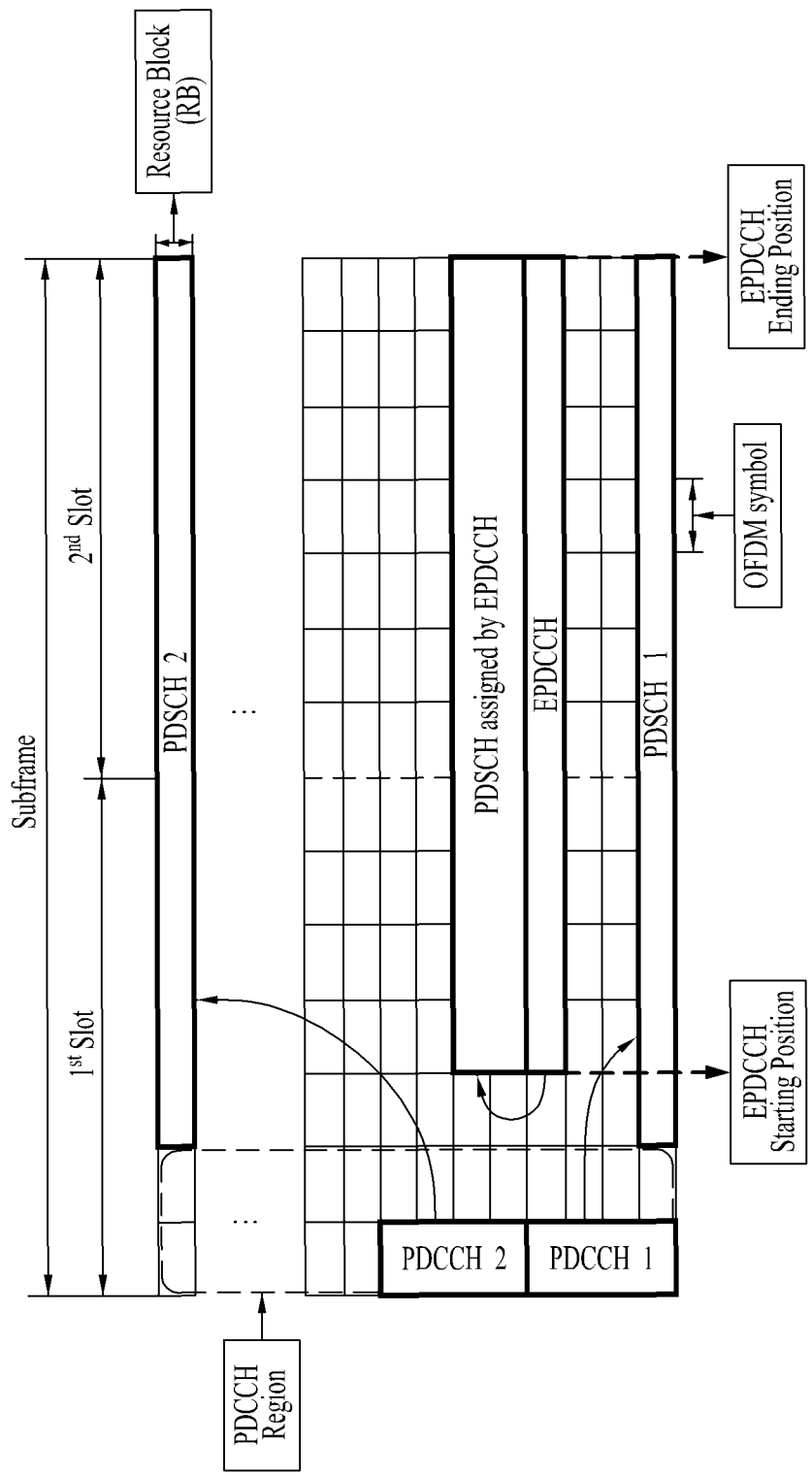
FIG. 6 illustrates a data channel scheduled by a physical downlink control channel (PDCCH) or an enhanced PDCCH (EPDCCH) and PDCCH/EPDCCH.

FIG. 6 illustrates a data channel scheduled by a PDCCH or an EPDCCH and a PDCCH/EPDCCH. Particularly, FIG. 6 illustrates the case in which the EPDCCH is configured by spanning the fourth symbol to the last symbol of a subframe. The EPDCCH may be configured using consecutive frequency resources or may be configured using discontinuous frequency resources for frequency diversity.

Referring to FIG. 6, PDCCH 1 and PDCCH 2 may schedule PDSCH 1 and PDSCH 2, respectively, and the EPDCCH may schedule another PDSCH.

Similarly to the case of a PDCCH, specific resource assignment units may be defined for the EPDCCH and the EPDCCH may be configured by a combination of the defined specific resource assignment units. When the specific resource assignment units are used, there is an advantage of enabling execution of link adaptation because less resource assignment units can be used to configure the EPDCCH in the case of a good channel state and more resource assignment units can be used to configure the EPDCCH in the case of a poor channel state. Hereinafter, in order to distinguish a basic unit of the EPDCCH from a CCE which is a basic unit of the PDCCH, the basic unit of the EPDCCH will be referred to as an enhanced CCE (ECCE). It is assumed hereinafter that, for an aggregation level L of the EPDCCH, the EPDCCH is transmitted on an aggregation of L ECCEs. Namely, like the aggregation level of the PDCCH, the aggregation level of the EPDCCH also refers to the number of ECCEs used for transmission of one DCI. Hereinafter, an aggregation of ECCEs on which the UE is capable of detecting the EPDCCH thereof will be referred to as an EPDCCH search space.

The ECCEs constituting the EPDCCH may be categorized into a localized ECCE (hereinafter, L-ECCE) and a distributed ECCE (hereinafter, D-ECCE) according to a scheme of mapping the ECCE(s) to RE(s). The L-CCE means that REs constituting an ECCE are extracted from the same PRB pair. If the EPDCCH is configured using L-ECCE(s), beamforming optimized for each UE can be performed. On the other hand, the D-ECCE corresponds to the case in which REs constituting the ECCE are extracted from different PRB pairs. Unlike the L-ECCE, the D-ECCE can acquire frequency diversity in spite of a restriction on beamforming.

Figure 7:
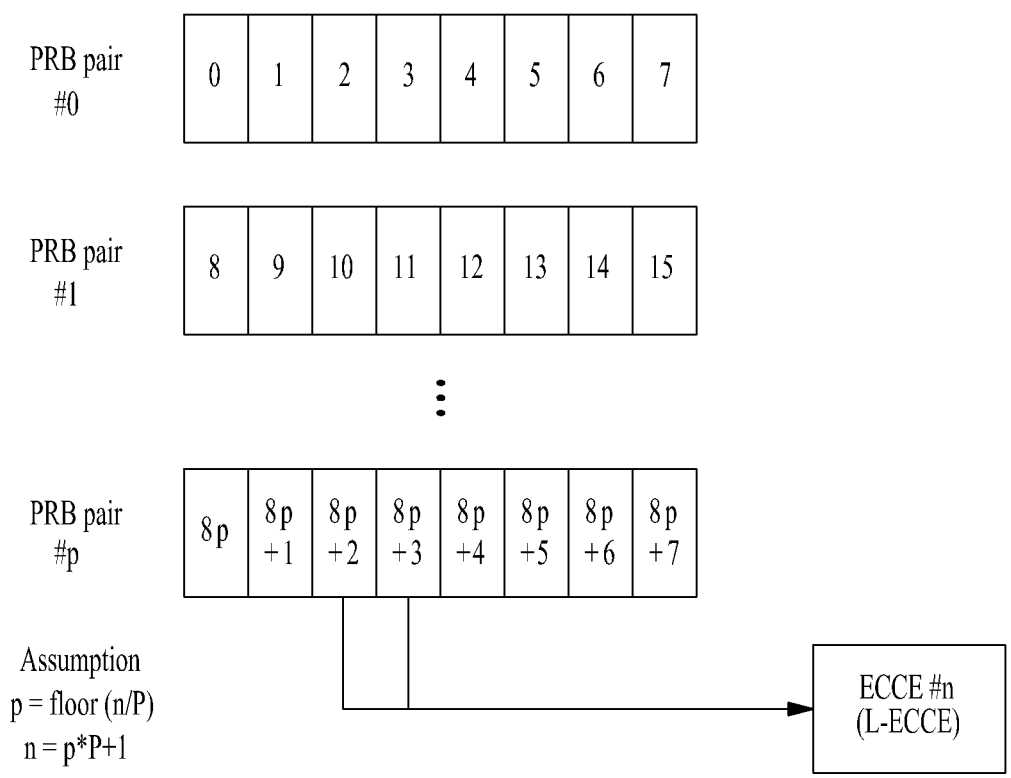
FIGS. 7 and 8 are diagrams for explaining the concept of a localized enhanced control channel element (ECCE) and a distributed ECCE.
Figure 8:
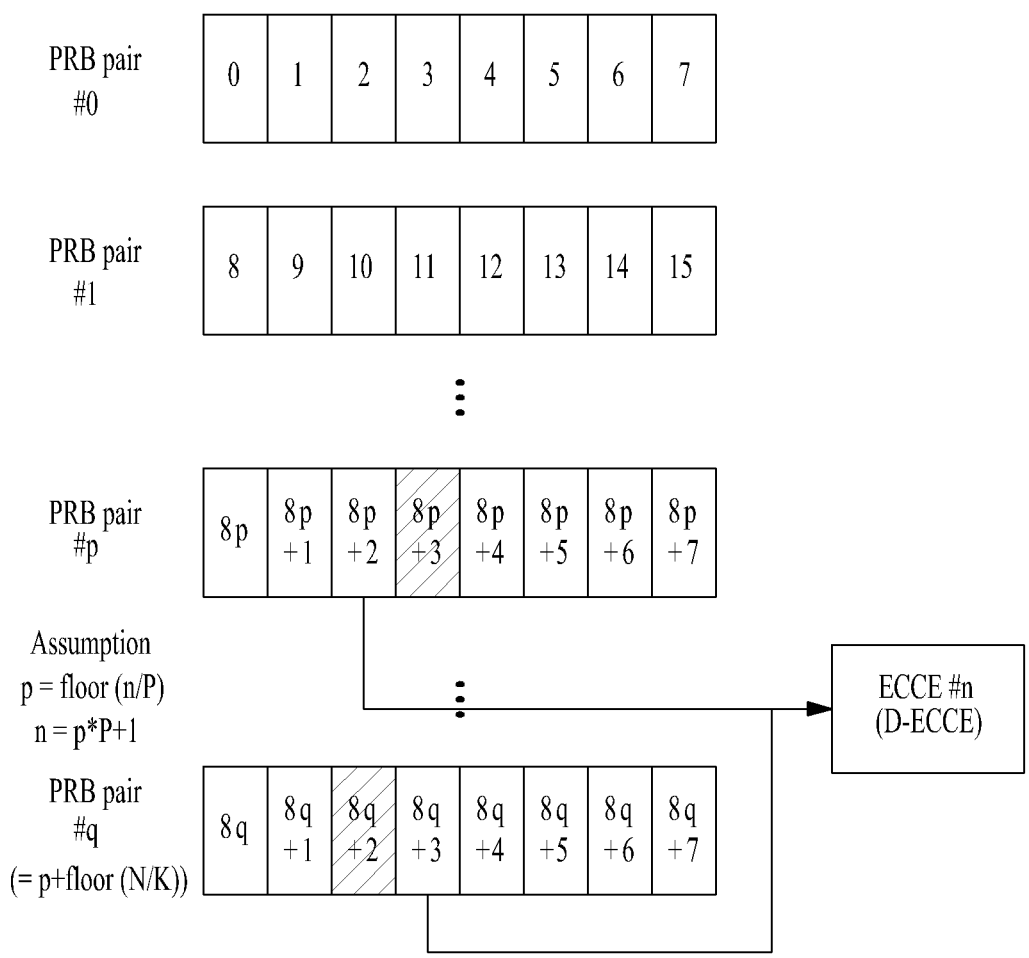

FIGS. 7 and 8 are diagrams for explaining the concept of an L-ECCE and a D-ECCE. In FIGS. 7 and 8, K denotes the number of RE sets constituting one ECCE, P denotes the number of ECCEs which can be configured in one PRB pair, and p denotes floor(n/P). In the present invention, an RE set may also be referred to as an enhanced REG (EREG).

Although it is assumed in FIGS. 7 and 8 that K=2 and P=4, K and P may have values other than 2 and 4, respectively.

In FIGS. 7 and 8, it is assumed that two PRB pairs are used to configure the L-ECCE and D-ECCE and available REs in one PRB pair are divided into 8 RE sets. It is also assumed that one L-ECCE is formed using two RE sets belonging to one PRB pair and one D-ECCE is formed using two RE sets, each RE set in each of two PRB pairs.

Referring to FIG. 7, the L-ECCE is configured by two RE sets having consecutive indexes in the same PRB pair.

Referring to FIG. 8, the D-ECCE is configured by two RE sets which belong to two different PRB pairs and correspond to RE sets of relatively consecutive locations.

In the case of a PDCCH, the PDCCH is composed of consecutive CCE(s) and each CCE corresponds to 9 REGs. Referring to FIG. 4, REGs are sequentially mapped to every four REs starting from REs of the lowest subcarrier index among available REs (e.g. REs other than CRS REs) in OFDM symbol index l=0. Namely, since the CCE is not classified as a localized CCE and a distributed CCE, the eNB configures the PDCCH with the necessity of considering the type of the CCE and the UE need not consider the type of the CCE upon decoding the PDCCH. In the case of an EPDCCH, REs included in the EPDCCH differ according to whether the EPDCCH is configured using the L-ECCE or using the D-ECCE.

Therefore, the present invention proposes that the EPDCCH be configured in consideration of the type of an ECCE as well as a DCI format. The UE of the present invention attempts to decode an EPDCCH thereof in an EPDCCH search space in consideration of the type of the ECCE as well as the DCI format. The UE of the present invention may detect the EPDCCH thereof by attempting to decode EPDCCH candidate(s) in the EPDCCH search space according to a DCI format for a TM configured therefor and a type of the ECCE configured therefor. In other words, the UE may acquire DCI by decoding a signal received over the EPDCCH according to the DCI format for the TM and the type of the ECCE. The UE may identify REs in an ECCE constituting the EPDCCH according to the type of the ECCE configured therefor and attempt to decode a signal received on the REs according to the DCI format defined for the TM configured therefor.

Fallback is at issue. The present invention proposes that the UE configured to decode the EPDCCH not fall back to a PDCCH and the UE attempt to decode the EPDCCH according to a fallback DCI format for the TM thereof, together with decoding of the EPDCCH according to a TM DCI format corresponding to the TM or upon failure of decoding of the EPDCCH according to the TM DCI format. The UE of the present invention considers not only the DCI format for the TM but also the type of the ECCE, during decoding of the EPDCCH. In the present invention, the ECCE type may be differently or partially identically configured according to the TM configured for the UE. The ECCE type is not determined regardless of the TM and may be predetermined in association with the TM. Alternatively, the eNB may inform the UE of the TM for the UE using a higher layer signal and also inform the UE of the ECCE type for the TM. The eNB may independently configure the TM and the ECCE type and inform the UE of the TM and the ECCE type.

In relation to fallback, the present invention proposes that the eNB inform the UE of an ECCE type for fallback DCI transmission (hereinafter, a fallback ECCE type) of a specific TM through a higher layer signal or a physical layer signal separately from an ECCE type for TM DCI or the eNB determine the fallback ECCE type based on a predefined rule. For example, the fallback ECCE type of a specific TM may be regulated to conform to the TM DCI. As another example, the fallback ECCE type may be differently or partially identically configured according to TMs. In other words, the fallback ECCE type is not determined regardless of the TM and may be predetermined in association with the TM. Alternatively, the same ECCE type for all TMs may be defined as the fallback ECCE type irrespective of the TM. For example, a D-ECCE may be defined as the fallback ECCE type in order to obtain diversity gain in a fallback mode.

Consequently, the UE of the present invention attempts to decode an EPDCCH candidate according to a TM DCI format corresponding to a TM for the UE and an ECCE type for the UE in an EPDCCH search space. Regardless of whether decoding of the EPDCCH according to the TM DCI format and the ECCE type is successful or not or in the case of decoding failure, the UE attempts to decode the EPDCCH candidate according to a fallback DCI format and a fallback ECCE type. Through this, a time-frequency resource corresponding to an EPDCCH candidate that the UE has successfully decoded becomes a time-frequency resource of an EPDCCH carrying DCI for the UE and a DCI format and an ECCE type applied to successful decoding become a format of the DCI and a type of ECCE(s) in the EPDCCH.

Hereinafter, embodiments of the present invention of a multiplexing scheme of an L-ECCE and a D-ECCE and a method for determining a starting position of an EPDCCH candidate in an EPDCCH search space will be described. Decoding of the EPDCCH according to the fallback DCI format and the fallback CCE type may be applied to the UE separately from the embodiments described below or together with one or more combinations of the embodiments described below.

FIG. 9 illustrates a method for indexing ECCEs.

From the viewpoint of an L-ECCE, ECCE indexes are sequentially assigned to ECCEs in one PRB pair while increasing by one and then are sequentially assigned to ECCEs in the next PRB pair. However, the ECCE indexes may be re-indexed by a given rule for actual EPDCCH search space configuration. For example, re-indexing may be performed such that the ECCE indexes are assigned to ECCEs belonging to neighbor PRB pairs based on the L-ECCE while increasing by one.

Especially, FIG. 9 shows an example of performing re-indexing such that indexes which have been assigned by a scheme of increasing indexes first within a PRB pair are re-indexed by a scheme of increasing indexes first along neighbor PRB pairs under the assumption that four ECCEs per PRB pair, i.e. a total of 32 ECCEs in a total of 8 PRB pairs, is configured.

Figure 10:
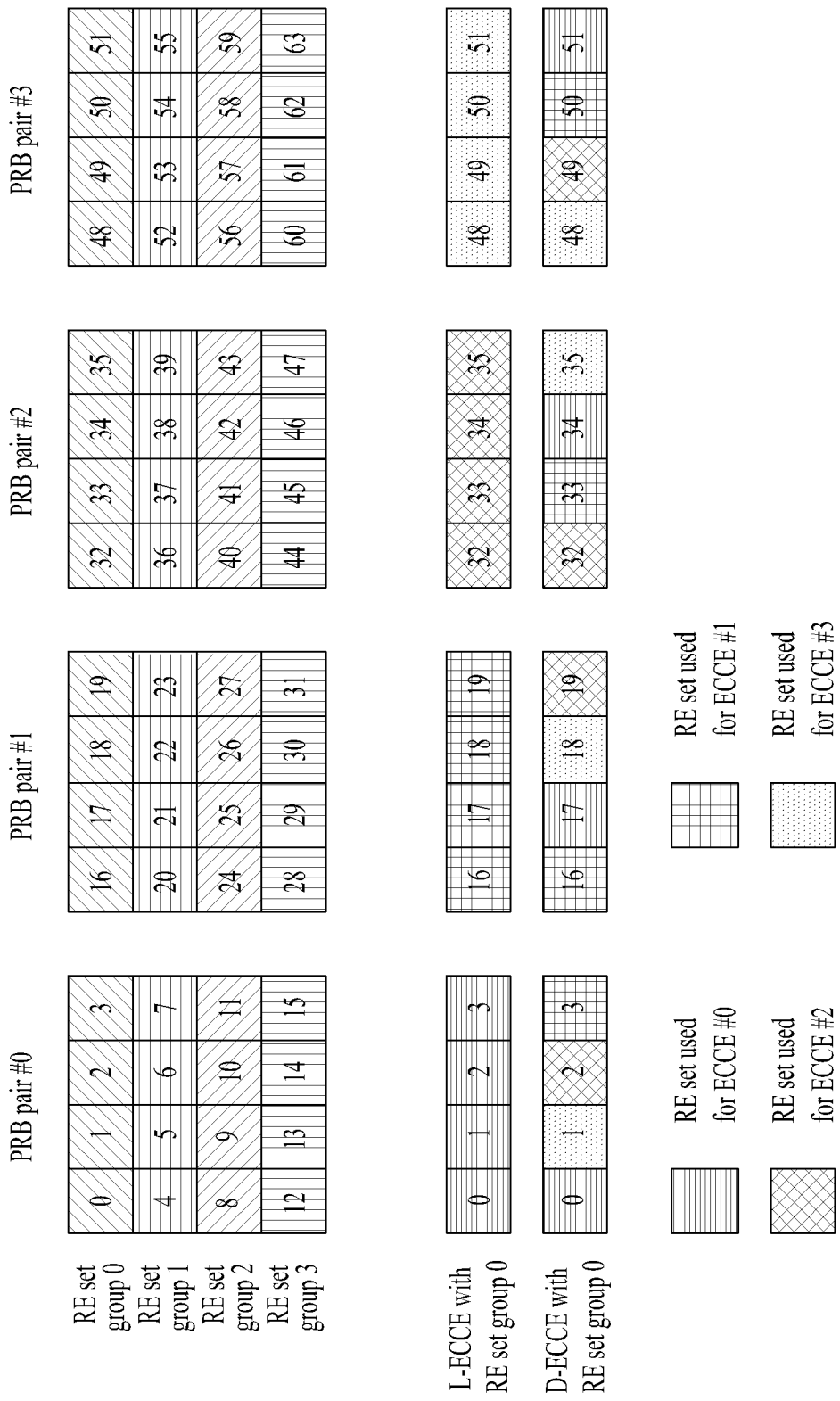
FIG. 10 illustrates configuration of a localized ECCE (L-ECCE) and a distributed ECCE (D-ECCE) in a situation in which a physical resource block (PRB) pair for an EPDCCH is given.

FIG. 10 illustrates configuration of an L-ECCE and a D-ECCE in a situation in which a PRB pair for an EPDCCH is given.

In FIG. 10, it is assumed that 4 PRB pairs are used, available REs in each PRB pair are segmented into 16 RE sets, and one ECCE is composed of 4 RE sets. It is also assumed that RE sets constituting each ECCE are composed of 4 RE sets with consecutive indexes in the same PRB pair in the case of the L-ECCE and are composed of 4 RE sets of relatively consecutive locations in separated PRB pairs in the case of the D-ECCE.

In FIG. 10, RE sets {0, 1, 2, 3, 16, 17, 18, 19, 32, 33, 34, 35, 48, 49, 50, 51} are configured as group #0 and, in a similar way, a total of 4 RE set groups are configured. Referring to FIG. 10, if an ECCE type is determined to be one of the L-ECCE and the D-ECCE with respect to one group, it may be appreciated that the ECCE type using RE sets belonging to the group is automatically configured. For example, if the L-ECCE is defined using resources of RE set group 0, the D-ECCE cannot be defined by RE set(s) belonging to RE set group 0 and ECCE(s) (ECCE #1, ECCE #2, and ECCE #3) using the same RE set group 0 automatically correspond to the L-ECCE. That is, the types of the L-ECCE and D-ECCE are determined per RE set group. In other words, when a set of ECCE index(es) is determined by a correlation between RE sets constituting the L-ECCE and the D-ECCE, a set of resources occupied by the set of the ECCE index(es) is fixed regardless of the ECCE type belonging to the set of the index(es). As an example, referring to FIG. 10, when a set of the ECCE indexes is given as {ECCE #0, ECCE #1, ECCE #2, ECCE #3}, a set of resources occupied by the set of the ECCE indexes has an attribute of being defined only using RE set group 0 irrespective of whether the 4 ECCEs are localized ECCEs or distributed ECCEs. Since this means that once an ECCE type of a specific RE set group is determined, the ECCE type of the specific RE set group does not affect ECCE types of other RE groups, the D-ECCE and the L-CCE can be freely multiplexed in the unit of RE set groups.

Figure 11:
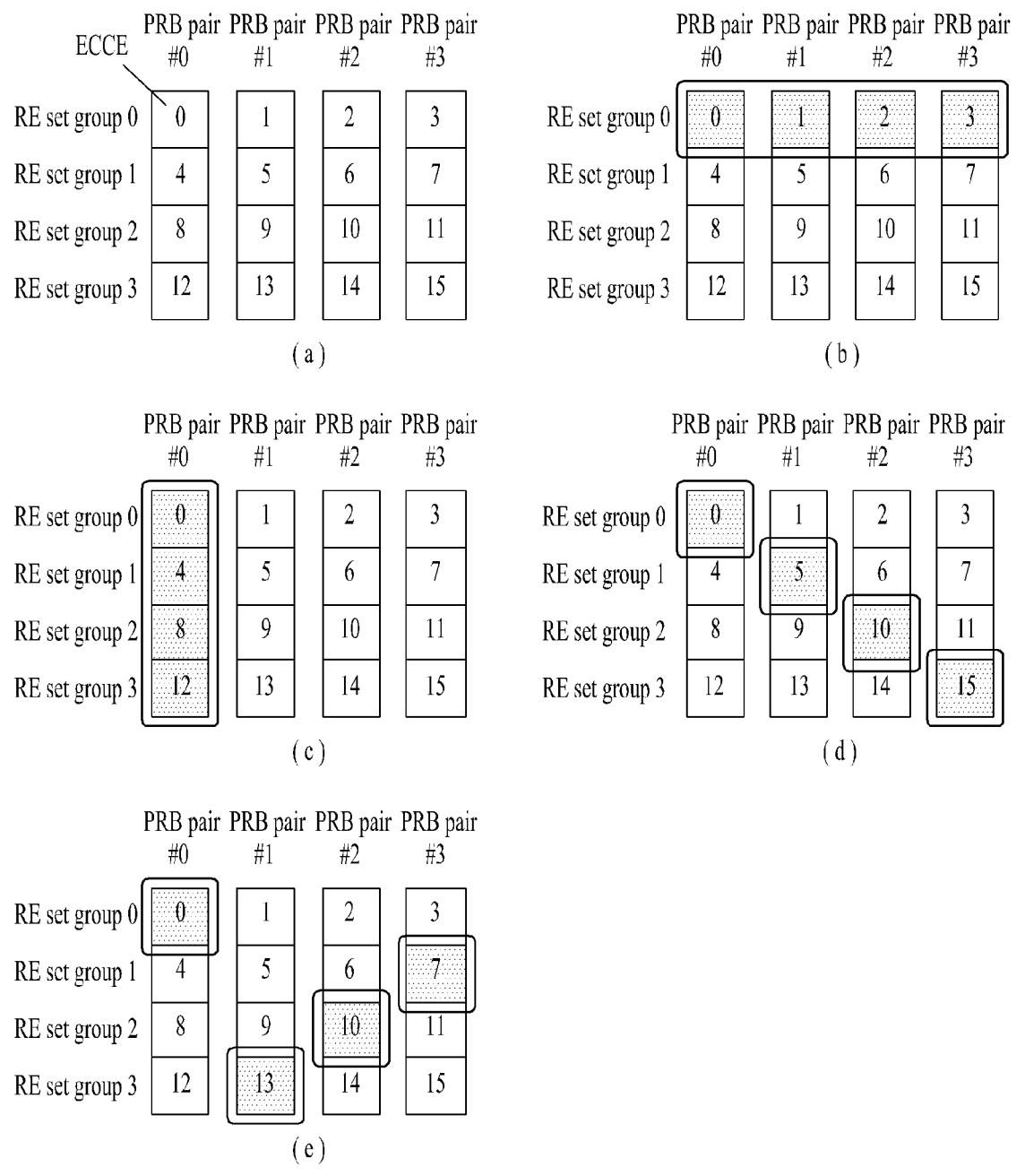

FIG. 11 illustrates an example of determining schemes for multiplexing an L-ECCE and a D-ECCE and then determining a starting position of an EPDCCH candidate in a search space according to an embodiment of the present invention.

It is assumed in FIG. 11(*a*) that an EPDCCH search space is composed of 16 ECCEs and an EPDCCH of an L-ECCE type is allocated to the UE. For example, when a maximum of 4 blind decoding trials can be performed at each aggregation level, 4 ECCE candidates usable as a starting position needs to be determined. When an ECCE of aggregation level 1 is blind-decoded, the following rules may be applied in order to determine the starting position.

1) First rule: It is not proper that many ECCE candidates usable as a starting position are included in a specific RE set group. This is because, if some of ECCEs or REGs constituting the RE set group are judged to be a D-ECCE type in a situation in which candidates of an EPDCCH starting position gather in one RE set group as illustrated in FIG. 11(*b*), an L-ECCE cannot be multiplexed in the other part of a region of the RE set group. Therefore, it is necessary to evenly distribute starting positions for blind decoding in multiple RE set groups.

2) Second rule: It is also undesirable that a large number of ECCE candidates usable as the starting position gather in a specific PRB pair. If starting positions for blind decoding are present only in a part of PRB pairs designated as the search space as illustrated in FIG. 11(*c*), a scheduling scheme for resolving or utilizing frequency selective characteristics of a channel cannot be sufficiently used. As an example, if all candidates of an EPDCCH starting point are present in one PRB pair, the eNB has to configure the EPDCCH in a corresponding RB irrespective of whether the channel state of the RB is good or bad.

When the above two rules are considered, it is desirable that candidates of a starting position for EPDCCH blind decoding be evenly distributed in a PRB pair domain and an ECCE domain as illustrated in FIG. 11(*d*) or FIG. 11(*e*).

Figure 12:
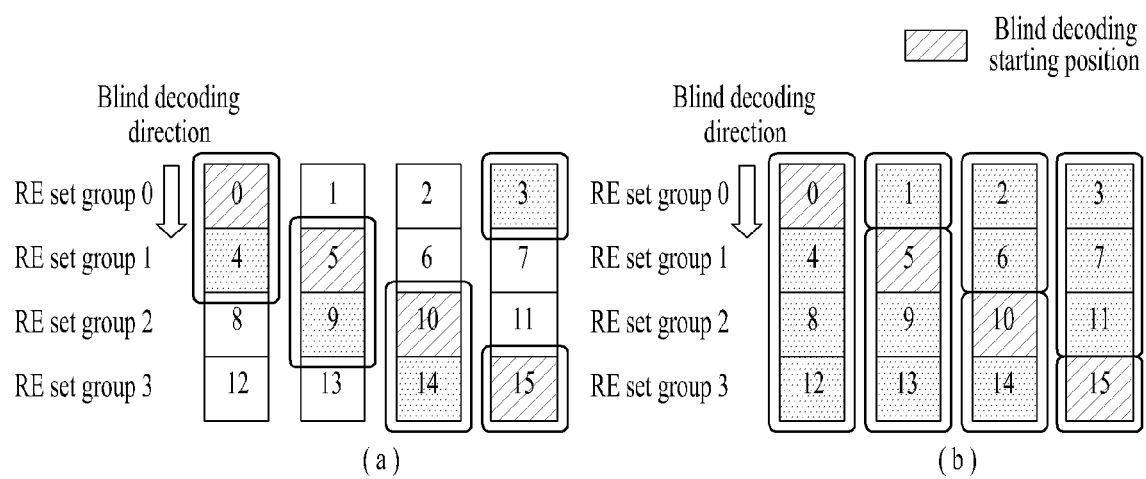
FIG. 12 illustrates another example of determining a starting position of an EPDCCH candidate in a search space according to an embodiment of the present invention.

FIG. 12 illustrates another example of determining a start position of an EPDCCH candidate in a search space according to an embodiment of the present invention. Particularly, FIG. 12(*a*) illustrates blind decoding start positions when an aggregation level is 2 and FIG. 12(*b*) illustrates blind decoding start positions when the aggregation level is 4.

If a scheme as shown in FIG. 11(d) is similarly applied to aggregation level 2 or aggregation level 4, starting positions for blind decoding as shown in FIG. 12 may be defined and as many blind decoding trials as the number of ECCEs corresponding to a corresponding aggregation level may be performed.

Let's assume that an index of an ECCE on which blind decoding is performed for the first time is k, a blind decoding order is n, and a gap between blind decoding trials is g.

For example, since g=1 in FIG. 11(b), ECCE index s(n) corresponding to the starting position of each blind decoding trial may be determined by:

$$s(n)=k+n\cdot 1 \quad \text{[Equation 3]}$$

As another example, since g=4 in FIG. 11(c), ECCE index s(n) corresponding to the starting position of each blind decoding trial may be determined by:

$$s(n)=k+n\cdot 4 \quad \text{[Equation 4]}$$

When the number of ECCEs per PRB pair is $N_{cp}$, k in Equation 3 and Equation 4 does not exceed $N_{cp}-1$. Namely, k is an integer which does not exceed $N_{cp}-1$ and is not negative.

Based on the first rule considered to determine the starting position of blind decoding, the present invention evenly distributes the starting positions of different blind decoding trials in every RE set group so that the staring positions are not present in the same RE set group. Therefore, according to the present invention, index s(n) for an n-th blind decoding is determined from among values from $N_{cp} \cdot n$ to $N_{cp} \cdot (n+1)-1$. When this situation is considered together with the fact that a constant gap g is present between blind decoding trials, the starting position of each blind decoding trial may be expressed by:

$$s(n)=N_{cp}\cdot n+(k+n\cdot g)\bmod N_{cp} \quad \text{[Equation 4]}$$

According to the second rule considered to determine the starting position of blind decoding, it is favorable that the starting positions of different blind decoding trials not be present in the same PRB pair. In consideration of this situation, the gap between the blind decoding trials desirably has a value which is greater than the number of RE set groups or the number of ECCEs in a PRB pair and is relatively prime with the number of RE set groups or the number of ECCEs in a PRB pair. The number of RE set groups and the number of ECCEs in a PRB pair may be determined to be the same value. When this principle is applied, g may be 5, 7, 9 . . . . FIG. 11(d) shows that g=5 and FIG. 11(e) shows that g=7. In FIG. 11(d), an ECCE index corresponding to the starting position of blind decoding may be expressed by:

$$s(n)N_{cp}\cdot n+(k+n\cdot 5)\bmod N_{cp} \quad \text{[Equation 5]}$$

Equation 4 may be effectively applied when the number of blind decoding trials is identical to the number of RE set groups and the number of PRB pairs allocated for an EPDCCH. When an aggregation level is 1, it may be appreciated that one index per RE set group and per PRB pair is evenly selected.

A generalized equation, for ECCE index s(n) of the starting position of blinding decoding, which can be applied even when a more number of PRB pairs or a smaller number of PRB pairs than the number $N_{cp}$ of ECCEs per PRB pair is allocated as a set of PRB pair(s) for the EPDCCH may be expressed by:

$$s(n)=(k+n\cdot g)\bmod(N\cdot N_{cp}) \quad \text{[Equation 6]}$$

where N is a constant, for example, ½, 1, 2, 4, etc.

As in Equation 4, in Equation 6, k is an index of an ECCE on which blind decoding is performed for the first time, n is a blind decoding order, and g is a gap between blind decoding trials. Since modulo operation is applied so that an ECCE index value may be circularly shifted in order to prevent the ECCE index value from excessively increasing, k may be any value between '0' to '$N \cdot N_{cp}-1$'.

Figure 13:
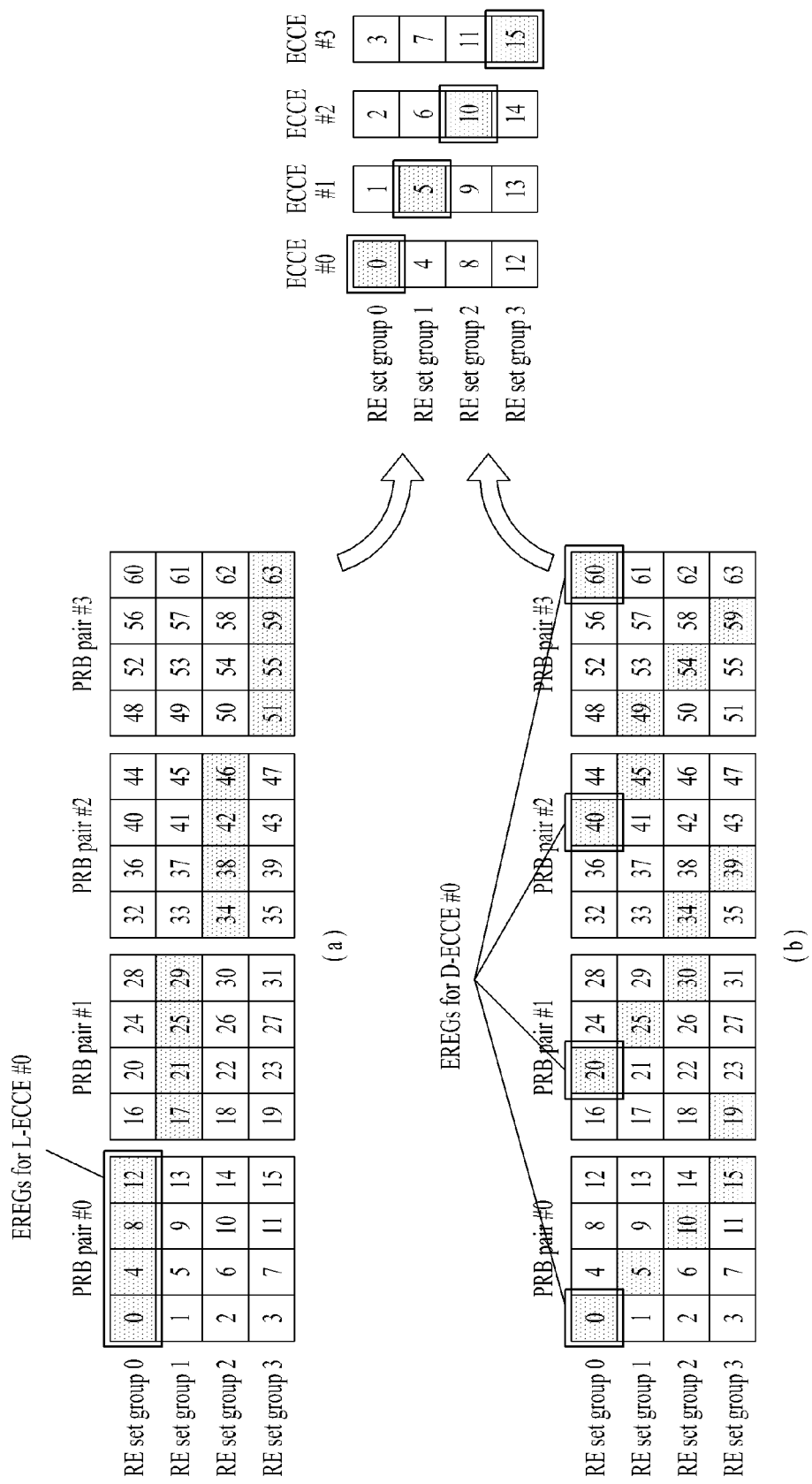
FIG. 13 illustrates still another example of determining a starting position of an EPDCCH candidate in a search space according to an embodiment of the present invention.

FIG. 13 illustrates still another example of determining a starting position of an EPDCCH candidate in a search space according to an embodiment of the present invention. Especially, FIG. 13(a) illustrates the starting positions of EPDCCH candidates in the case of an L-ECCE and FIG. 13(b) illustrates the starting positions of EPDCCH candidates in the case of a D-ECCE.

The above-described embodiments regarding the starting positions of blind decoding may be applied to a D-ECCE as well as to an L-ECCE. Referring to FIG. 13 as an example, when an aggregation level is 1, ECCEs which do not overlap in each RE set group in both the L-ECCE and the D-ECCE are selected as blind decoding starting positions in an EPDCCH search space. RE sets constituting the L-ECCE and RE sets constituting the D-CCE differ in that the former is selected from one PRB pair and the latter is selected from different PRB pairs. However, the L-ECCE and the D-ECCE are identical to each other in terms of a logical ECCE index. Even in the case of the D-ECCE, equations for an ECCE index corresponding to the blind decoding starting position may be defined identically to the above-described equations (e.g. Equation 3 to Equation 6).

In order to satisfy the above first and second rules for determining the blind decoding starting position, g may be determined to be a value greater than $N_{cp}$ and it is desirable that the blind decoding starting positions be evenly allocated over all PRB pairs and all ECCE indexes. To this end, g satisfying the following conditions may be set as a gap for blind decoding.

i) $g > N_{cp}$ (g and $N_{cp}$ are relatively prime)
ii) $g > \text{floor}\{(N \cdot N_{cp})/N_{bd}\}$ where $N_{bd}$ denotes the number of blind decoding trials. The above conditions i) and ii) may be applied when ECCE indexing is performed first within a PRB pair. That is, the above conditions i) and ii) may be applied to the case in which ECCE indexes are first assigned to ECCEs within one PRB pair and, if all of the ECCE indexes are assigned to the ECCEs within the PRB pair, ECCE indexes are assigned to ECCEs within the next PRB pair.

When ECCE indexing can be performed when indexes are first assigned to one EPDCCH set consisting of N PRB pairs, g satisfying the following conditions iii) and iv) may be determined as a gap for blind decoding.

iii) $g > N$ ('g mod $(N \cdot N_{cp})$' and N are relatively prime)
iv) $g > \text{floor}\{(N \cdot N_{cp})/N_{bd}\}$ As another scheme for determining g, even when g is less than $N_{cp}$ or N, it may be regulated that one of values satisfying a condition that 'g mod $(N \cdot N_{cp})$' (or g) and $N_{cp}$ are relatively prime and/or a condition that 'g mod $(N \cdot N_{cp})$' (or g) and N are relatively prime is defined as g. Information about whether to apply the above condition(s) or about parameters having a relatively prime relationship with g may be indicated by the eNB to the UE through a predefined signal or may be determined to be implicitly recognized by a predefined rule.

As another example, according to value N constituting a specific EPDCCH set, the number of EPDCCH candidates present in one specific PRB pair in terms of one PRB pair may be '2 or 1' (e.g. when N=4) or may be '1 or 0' (e.g. when N=8). For example, a rule may be defined such that, in the case in which the number of EPDCCH candidates is '2 or 1', g is set to '$N_{cp}-1$' (e.g. 3) or 'N−1' (e.g. 3) and, in the case in which the number of EPDCCH candidates is '1 or 0', g is be set to '$2N_{cp}-1$' (e.g. 7) or 'N−1' (e.g. 7). It may be regulated that g derived by the above methods is calculated by a predefined function having, argument(s), parameters such as the number of blind decoding requests of a specific aggregation level in one EPDCCH, the number of EPDCCH sets allocated to a specific UE, the number of PRB pairs constituting a specific EPDCCH set, etc.

Hereinafter, the embodiments of the present invention regarding the above-described blind decoding starting position will be described in more detail in terms of an equation. A localized EPDCCH refers to an EPDCCH configured as one more localized ECCEs and a distributed EPDCCH refers to an EPDCCH configured as one or more distributed ECCEs. For an EPDCCH, EPDCCH blind decoding candidates of a certain aggregation level need to be distributed as much as possible among N PRB pairs of an EPDCCH set. By doing so, the present invention can achieve high frequency selection diversity in localized EPDCCH transmission. For the simplicity of implementation, assuming that L ECCEs which are aggregated consecutively in a logical domain are used for defining EPDCCH candidate m at aggregation level L, in order to realize the placement of each localized EPDCCH candidate that satisfies the above mentioned property, a starting ECCE index corresponding to EPDCCH candidate m at aggregation level L may be given by:

$$S_k^{(L)}=L\cdot\{(Y_k+m\cdot G)\bmod(N\cdot N'_{ECCE,k})\}+i \quad [\text{Equation 7}]$$

where i=0, ..., L−1, m=0, ..., $M^{(L)}$−1, $M^{(L)}$ is the total number of localized EPDCCH candidates at aggregation level L, G is an offset value between $M^{(L)}$ starting ECCE indexes, N is the total number of PRB pairs in one EPDCCH set, $L'_{ECCE,k}$ is the total number of ECCEs per PRB pair in subframe k, and $Y_k$ is a pseudo-random variable depending on a C-RNTI. When the offset value is set to a properly predefined value, it is possible to distribute $M^{(L)}$ starting ECCE indexes as much as possible among N PRB pairs of an EPDCCH set. This offset value may be determined by considering several variables such as N and $M^{(L)}$. This is because different offset values are needed to uniformly distribute EPDCCH candidates having different PRB pair numbers and candidate numbers in an EPDCCH search space. In addition, the offset value is needed to be relatively prime with N. This property ensures the avoidance of existence of multiple EPDCCH candidates in a PRB pair as much as possible. For example, in the case in which an EPDCCH set is defined as a group of 4 PRB pairs (i.e. normal subframe with a normal CP), there exist 16 ECCEs which are used for the EPDCCH search space. If the offset value G is set to 4 which is not relatively prime with N, the starting ECCE indexes of 6 EPDCCH candidates of aggregation level 1 are determined as [0, 4, 8, 12, 0, 4] which are derived from Equation 7. It is observed that the positions of EPDCCH candidates of aggregation level 1 overlap because the starting ECCE indexes 0 and 4 are repeated in the case in which the offset value G does not satisfy a condition that G is relatively prime with N. Details of the offset value may be determined in consideration of these values (i.e., K and N) where K denotes the number of RE sets constituting one ECCE (i.e. the number of EREGs). L ECCEs from the starting position which can be derived from Equation 7 are used to define EPDCCH candidate m at aggregation level L.

Figure 14:
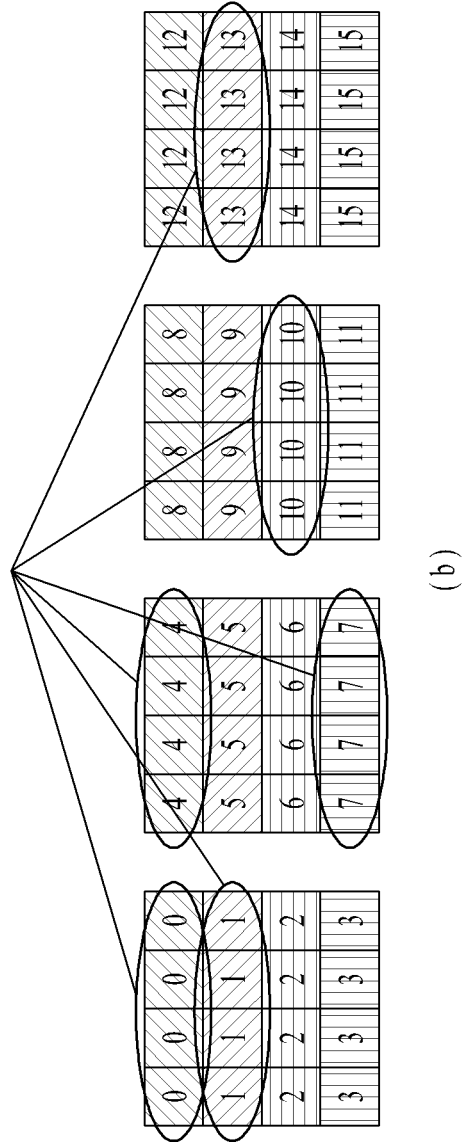
FIGS. 14 and 15 illustrate examples of localized EPDCCH candidates of aggregation level 1 according to an embodiment of the present invention.
Figure 15:
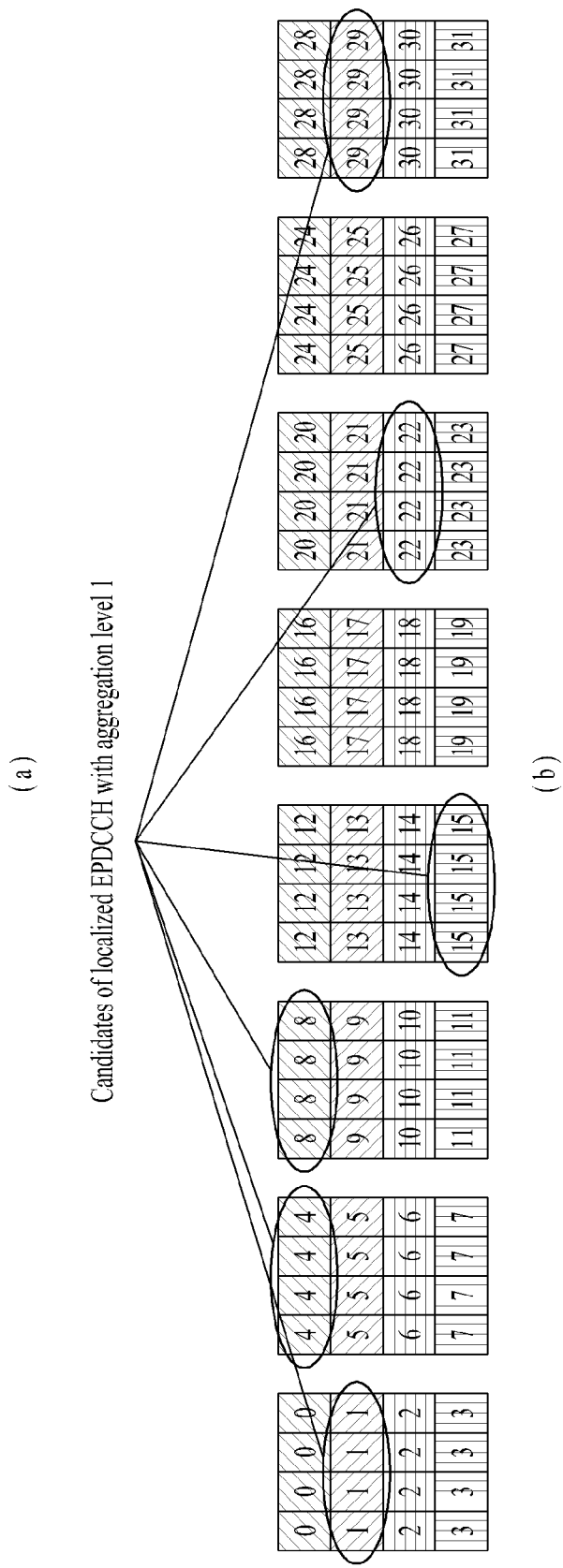

FIGS. 14 and 15 illustrate examples of localized EPDCCH candidates of aggregation level 1 according to an embodiment of the present invention.

It is assumed in FIGS. 14 and 15 that 4 REGs are used for each ECCE. It is also assumed that there are 6 EPDCCH candidates of aggregation level 1 and the value of $Y_k$ is set to 1. It is assumed that 4 PRB pairs and 8 PRB pairs for one EPDCCH set are configured in FIG. 14 and FIG. 15, respectively. In FIGS. 14 and 15, a grid of 4*4 indicates 16 RE sets, i.e. a set of 16 EREGs. Especially, each grid in FIGS. 14(a) and 15(b) indicates 16 EREGs included on one PRB pair. In each grid of FIGS. 14(b) and 15(b), 4 REGs constituting one ECCE are represented by the same pattern.

As illustrated in FIG. 14, based on Equation 7, EPDCCH candidates of a certain aggregation level may be distributed among NPRB pairs of an EPDCCH set as much as possible. Furthermore, if PRB pairs containing multiple EPDCCHs are located adjacently in a logical domain, a PRB pair permutation may be considered to achieve high frequency diversity in a physical domain, if needed.

Figure 16:
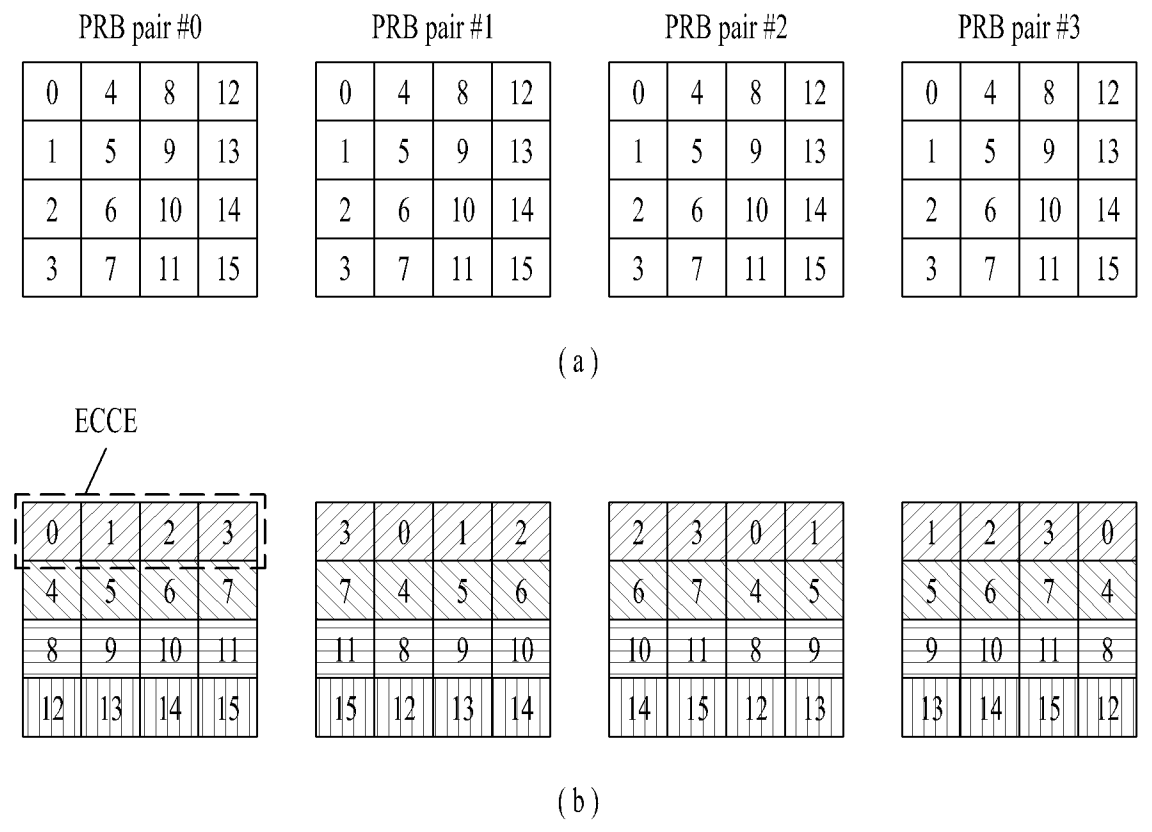
Figure 17:
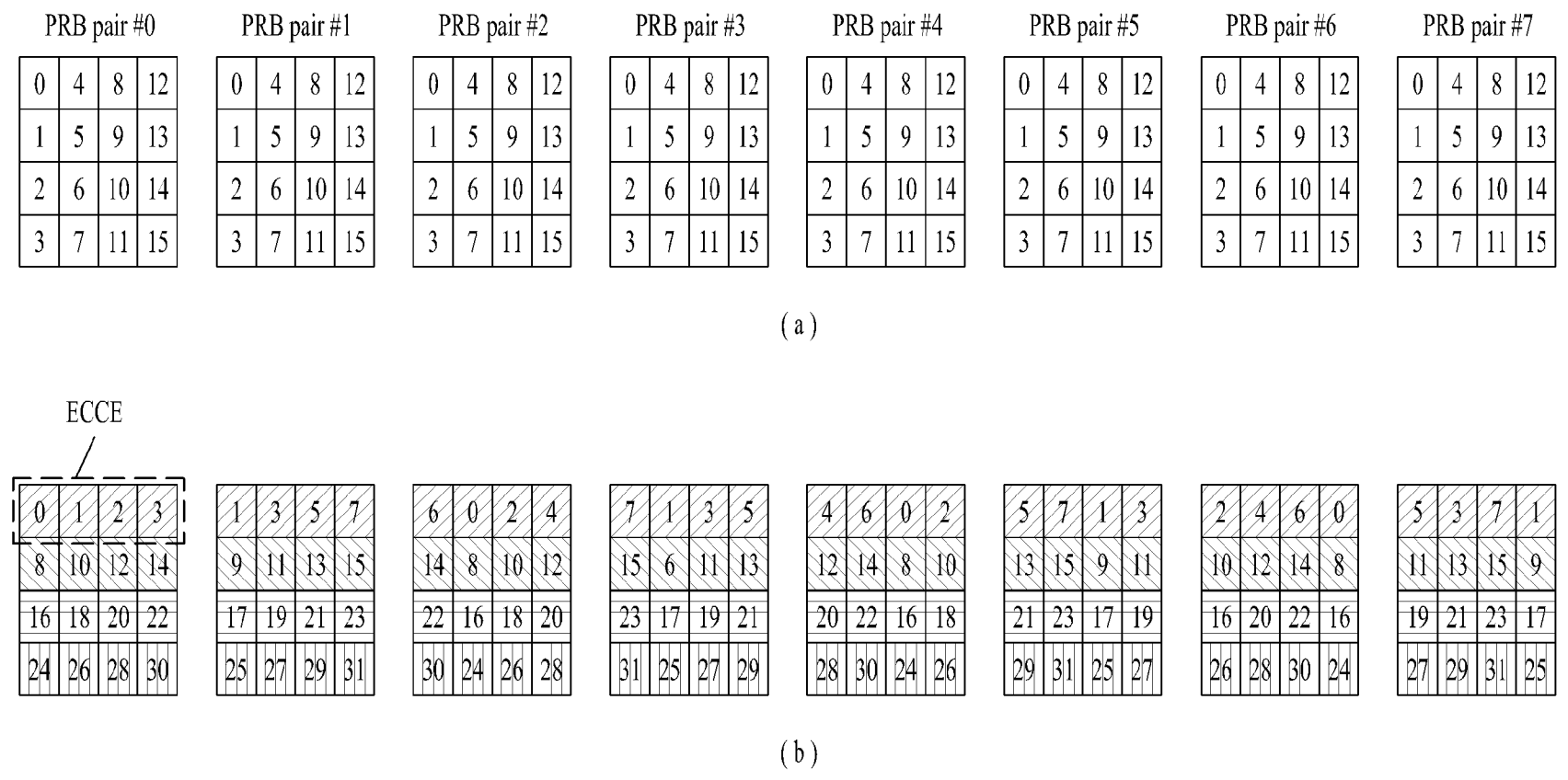

FIGS. 16 and 17 illustrate mapping of a distributed ECCE to an EREG according to an embodiment of the present invention.

It is assumed in FIGS. 16 and 17 that 4 REGs are used for each ECCE. It is also assumed that 4 PRB pairs and 8 PRB pairs for an EPDCCH set are configured in FIG. 16 and FIG. 17, respectively. In FIGS. 16 and 17, a grid of 4*4 indicates 16 RE sets, i.e. a set of 16 EREGs. Especially, each grid in FIGS. 16(a) and 17(b) indicates 16 EREGs included in one PRB pair. In each grid of FIGS. 16(b) and 17(b), 4 REGs constituting one ECCE are represented by the same pattern.

Figure 18:
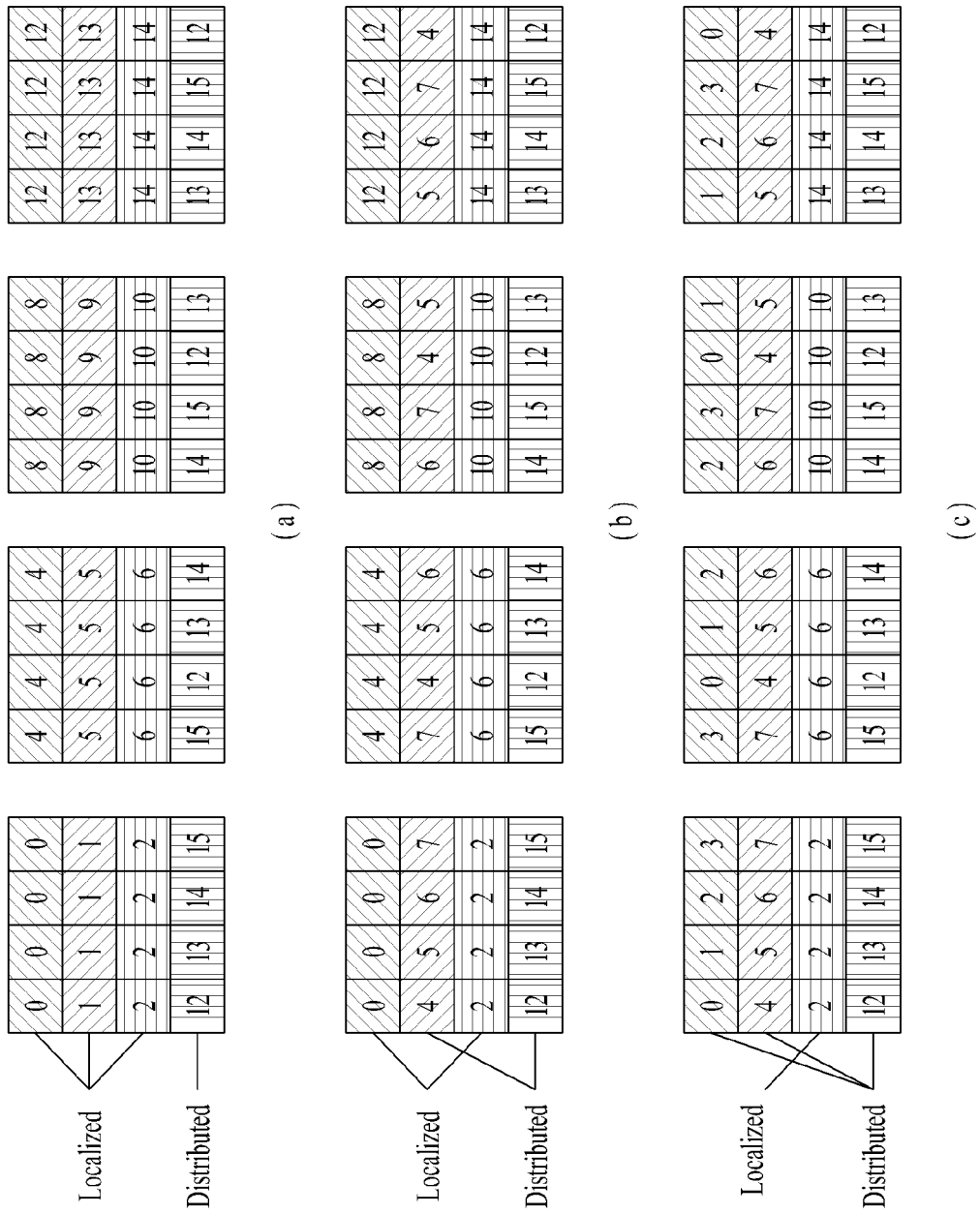
FIG. 18 illustrates multiplexing of a localized EPDCCH and a distributed EPDCCH according to an embodiment of the present invention.

FIG. 18 illustrates multiplexing of a localized EPDCCH and a distributed EPDCCH according to an embodiment of the present invention. Particularly, FIG. 18 shows that 4 PRB pairs are configured for one EPDCCH set.

In FIG. 18(a), 12 REGs corresponding to 3 ECCEs among 16 REGs in one PRB pair are allocated to a localized EPDCCH and the other 4 REGs are allocated to a distributed EPDCCH. In FIG. 18(b), 8 REGs corresponding to two ECCES among 16 REGs in one PRB pair are allocated to the localized EPDCCH and the other 8 REGs are allocated to the distributed EPDCCH. In FIG. 18(c), 4 REGs corresponding to one ECCE among 16 REGs in one PRB pair are allocated to the localized EPDCCH and the other 8 REGs are allocated to the distributed EPDCCH. That is, FIGS. 18(a), 18(b), and 18(c) show that the ratio of allocation of REs usable for an EPDCCH to the localized EPDCCH to allocation of REs usable for the EPDCCH to the distributed EPDCCH among REs in a PRB pair is 3:1, 2:2, and 1:3, respectively.

Multiplexing of localized and distributed EPDCCHs is transparent to each UE and is treated as an eNB scheduling issue. Meanwhile, the following requirements need to be satisfied for the EPDCCH search space in order to enable efficient multiplexing of the localized and the distributed EPDCCHs in one PRB pair.

a) Requirement #1: EREG as a common resource unit for both the localized EPDCCH and the distributed EPDCCH, b) Requirement #2: Avoidance of PUCCH resource collision, c) Requirement #3: Minimal impact of different EPDCCH types.

Requirement #1 is a straightforward requirement for multiplexing of two EPDCCH types.

Requirement #2 is necessary if a UL ACK/NACK resource is determined by an ECCE index of corresponding DL assignment. ACK/NACK resource collision will occur if ECCE #n of a localized type and ECCE #n of a distributed type appear at the same time and the two ECCEs are used for DL assignment, i.e. DL grant transmission. Such PUCCH resource collision which may be generated by multiplexing localized/distributed ECCEs to PRB pair(s) can be prevented by guaranteeing a property indicating that ECCE #n of the localized type and ECCE #n of the distributed type partially share some RE(s) (e.g. EREG(s)). Requirement #2 can prevent UL ACK/NACK resource collision and correct simplification of scheduling caused by the eNB.

Requirement #3 relates to the impact of existence of different EPDCCH types. Because a set of used EREGs cannot be the same as the localized ECCE and the distributed ECCE, transmission of one localized ECCE will block transmission of multiple distributed ECCEs and vice versa. As it is evident that an ECCE of one type blocks multiple ECCEs of different types, it is desirable to minimize the number of ECCEs with different types when more than one ECCE is transmitted. This requirement can be satisfied by introducing the concept of an EREG set. In FIG. 14(b), 16 EREGs indicated by the same pattern may form one EREG set and, in FIG. 15(b), 32 EREGs indicated by the same pattern may form one EREG set. EREGs in one EREG set are used to form 4 ECCEs and 8 ECCEs in FIG. 14(b) and FIG. 15(b), respectively. Thus, no ECCE uses EREGs belonging to different EREG sets. In FIGS. 16 and 17, even though one L-ECCE blocks 4 D-ECCEs, the eNB may place 4 L-ECCEs without any further increase in the number of blocked D-ECCEs if the remaining EREGs of the same EREG set are used for additional L-ECCE(s). In this sense, the number of ECCEs impacted by different ECCE types is minimized and the eNB is able to utilize more ECCEs for a corresponding EPDCCH type. The concept of an EREG set does not need to be defined explicitly, rather, it can be considered in structuring an EREG and an ECCE.

FIG. 19 illustrates an example of placing a localized EPDCCH in an EPDCCH set according to an embodiment of the present invention.

In FIG. 19, it is assumed that 4 PRB pairs are configured for an EPDCCH. FIG. 19(a) illustrates an example of placing localized EPDCCH candidates with 4 candidates in a single EREG set and FIG. 19(b) illustrates an example of placing 4 localized EPDCCH candidates with candidates in different EREG sets (i.e. 4 PRB pairs for an EPDCCH set).

Requirement #3 relates to the placement of each EPDCCH candidate which consists of one or multiple ECCEs. In placing EPDCCH candidates, it should be ensured that the number of EPDCCH candidates blocked by the existence of EPDCCHs of different types is limited from the perspective of each UE. For example, when 4 candidates of a localized EPDCCH with aggregation level 1 are defined, all the 4 candidates will be blocked by a single distributed ECCE if all of the 4 candidates are placed in the same EREG set as shown in FIG. 19(a). This problem can be solved by placing the 4 candidates in different EREG sets as shown in FIG. 19(b). As shown in FIGS. 14 and 15, by setting the offset value G to a properly predefined value (e.g. G is relatively prime with N) and using Equation 7, EPDCCH candidates of a certain aggregation level may be distributed among different EREG sets in an EPDCCH set as much as possible.

Meanwhile, as another implementation for achieving the present invention, the placement of EPDCCH candidates may be determined by:

$$S_k^{(L)} = L \cdot \{(Y_k + m \cdot G) \bmod (N \cdot N'_{ECCE,k})\} M^{(L)} - 1 M^{(L)} M^{(L)}$$
$$N'_{ECCE,k} Y_k M^{(L)} M^{(L)} (N/G \cdot C \cdot D(G,N)) \quad \text{[Equation 8]}$$

where 'G·C·D(G, N)' is a greatest common divisor of G and N.

Figure 20:
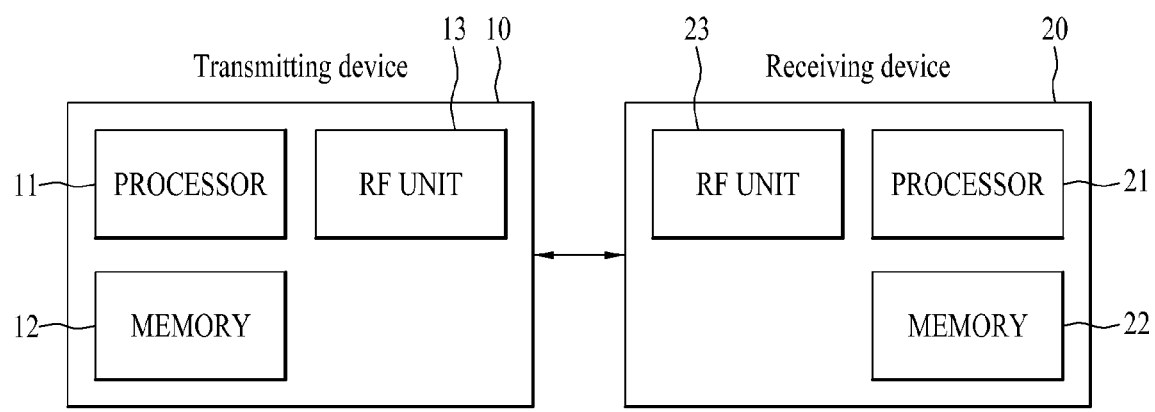
FIG. 20 is a block diagram illustrating elements of a transmitting device 10 and a receiving device 20 for implementing the present invention.

FIG. 20 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor of the present invention configures an EPDCCH according to any one of the embodiments of the present invention. The eNB processor may configure a set of PRB pairs (hereinafter, a PRB pair set) that the UE should monitor for transmission of the EPDCCH. The eNB processor may control the eNB RF unit to transmit information about the PRB pair set. The eNB processor may select one of EPDCCH candidates usable for transmission of the EPDCCH in the PRB pair set to the UE and use the selected EPDCCH candidate for transmission of the EPDCCH. The eNB processor may select an aggregation level for the EPDCCH. The eNB processor may configure the EPDCCH using ECCEs of a number corresponding to the aggregation level. The eNB processor may select DCI to be transmitted over the EPDCCH according to a TM DCI format corresponding to a TM of the UE. The eNB may control the eNB RF unit to transmit a higher layer signal including information indicating the TM to the UE. For example, referring to Table 6, if the UE is configured as TM 1 by the higher layer signal, the eNB processor configures (or generates) the DCI according to DCI format 1 which is a TM DCI format of TM 1. Here, in a situation in which it is difficult to maintain communication with the UE at TM 1 due to deterioration of a channel state or it is not proper to transmit DCI having DCI format 1, the eNB processor may fall back to a communication mode using DCI format 1A. In this case, the eNB processor configures (or generates) DCI according to DCI format 1A which is a fallback DCI format of TM 1. The eNB processor may configure an EPDCCH carrying the DCI. The eNB processor may configure the EPDCCH using one or more L-ECCEs or using one or more D-ECCEs. The number of L-ECCEs or the number of D-ECCEs included in one EPDCCH depends upon an aggregation level of the EPDCCH. In the present invention, the eNB processor configures, in a TM of the UE, not only the DCI with a DCI format corresponding to the TM but also an EPDCCH carrying the DCI with one or more L-ECCEs or one or more D-ECCEs according to an ECCE type of the UE. Notably, if the eNB or UE needs to operate in a fallback mode, the eNB processor configures the EPDCCH with one or more ECCEs of a predefined type out of the L-ECCE and the D-ECCE. Consequently, the eNB processor of the present invention controls the eNB RF unit to transmit DCI according to a TM DCI format of the UE over an EPDCCH composed of ECCE(s) of a set ECCE type configured for the UE or transmit DCI according to a fallback DCI format over an EPDCCH composed of ECCE(s) of a predefined ECCE type.

The eNB processor may map an ECCE for the EPDCCH to EREGs and PRB pair(s) according to any one of the embodiments of the present invention described with reference to FIGS. 11 to 19. The eNB processor may configure the EPDCCH using ECCE(s) including, as a starting ECCE, an ECCE given according to any one of Equation 3 to Equation 8.

The UE processor of the present invention configures the UE to decode the EPDCCH according to any one of the embodiments of the present invention. The UE RF unit may receive information about a PRB pair set the UE should monitor for transmission of the EPDCCH and the UE processor may monitor EPDCCH candidates in the PRB pair set. The UE processor attempts to decode the EPDCCH candidates in the PRB pair set according to a TM DCI format corresponding to a TM of the UE. The UE processor attempts to decode the EPDCCH candidates according to a predefined DCI format, irrespective of whether the EPDCCH according to the TM DCI format has been successfully decoded or only when decoding fails. The UE processor may determine that an EPDCCH candidate, decoding of which has been successfully performed according to the TM DCI format or the predefined DCI format among the EPDCCH candidates, is an EPDCCH of the UE. In the present invention, the UE processor considers an ECCE type as well as a DCI format in attempting to decode the EPDCCH candidate. The UE RF unit may receive ECCE type information indicating an ECCE type and the UE processor configures the UE in the form of receiving an EPDCCH configured as ECCE(s) of the ECCE type based on the ECCE type information. The UE processor may map ECCE(s) of an EPDCCH to EREGs in one PRB pair if the ECCE type for the UE corresponds to an L-ECCE and map the ECCE(s) of the EPDCCH to EREGs in multiple PRB pairs if the ECCE type for the UE corresponds to a D-CCE. If the UE processor decodes an EPDCCH according to the predefined DCI format, the UE processor decodes the EPDCCH according to the predefined ECCE type out of the L-ECCE and the D-ECCE regardless of an ECCE type configured for the UE by a higher layer signal. In other words, upon decoding the EPDCCH according to a fallback DCI format, the UE processor decodes the EPDCCH by mapping ECCE(s) to REG(s) and PRB pair(s) according to a localized mapping scheme if the predefined ECCE type corresponds to the L-ECCE and decodes the EPDCCH by mapping the ECCE(s) to the REG(s) and the PRB pair(s) according to a distributed mapping scheme if the predefined ECCE type corresponds to the D-ECCE. Namely, if the predefined ECCE type is a localized type, the UE processor attempts to decode a signal received in EREGs corresponding to CCE(s) of the EPDCCH among EREGs in a single PRB pair according to the fallback DCI format and, if the predefined ECCE type is a distributed type, the UE processor attempts to decode a signal received in EREGs corresponding to CCE(s) of a PDCCH among EREGs in multiple PRB pairs according to the fallback DCI format.

The UE processor may map ECCE(s) for the EPDCCH to EREGs and PRB pair(s) according to any one of the embodiments of the present invention described with reference to FIGS. 11 to 19. The UE processor regards ECCEs given according to any one of Equation 3 to Equation 8 as a starting ECCE and performs blind decoding with respect to ECCEs corresponding in number to an aggregation level beginning from the starting ECCE, thereby decoding an EPDCCH thereof among multiple EPDCCH candidates.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

While the above method for configuring a resource block for a search space of a distributed type downlink control channel in a wireless communication system and the apparatus therefor have been described based on an example applied to a 3GPP LTE system, the method and apparatus are applicable to a variety of wireless communication systems in addition to the 3GPP LTE system.

The invention claimed is:
1. A method for receiving a downlink signal by a user equipment in a wireless communication system, the method comprising:
  receiving, by the user equipment, first information indicating a plurality of physical resource block (PRB) pairs, on which an enhanced physical downlink control channel (EPDCCH) search space is configured, and second information indicating whether an enhanced control channel element (ECCE) type for the EPDCCH search space is a localized type or a distributed type; and
  receiving, by the user equipment, an EPDCCH of the user equipment by decoding EPDCCH candidates on the EPDCCH search space in a subframe,
  wherein each of the EPDCCH candidates is an aggregation of one or more ECCEs, each of which is composed of resource element sets belonging to a same PRB pair among the plurality of PRB pairs, when the ECCE type is the localized type, and
  wherein each of the EPDCCH candidates is an aggregation of one or more ECCEs, each of which is composed of resource element sets belonging to at least two different PRB pairs among the plurality of PRB pairs, when the ECCE type is the distributed type.
2. The method according to claim 1,
  wherein the subframe is divided into a control region and a data region in a time domain, and the EPDCCH search space is on the plurality of PRB pairs within the data region.

3. The method according to claim 2, further comprising:
  receiving, by the user equipment, a legacy physical downlink control channel (PDCCH) among a plurality of legacy PDCCH candidates within the control region,
  wherein each of the legacy PDCCH candidates is an aggregation of one or more legacy control channel elements (CCEs), each of which corresponds to 9 legacy resource element groups (REGs) among a plurality of legacy REGs within the control region, and
  wherein each of the plurality of legacy REGs consists of 4 consecutive resource elements not used for reference signals in an orthogonal frequency division multiplexing (OFDM) symbol of the control region.
4. The method according to claim 1,
  wherein each of the plurality of PRB pairs are segmented into 16 resource element sets, and
  wherein each ECCE for the localized and distributed types is composed of 4 resource element sets.
5. A user equipment for receiving a downlink signal in a wireless communication system, the user equipment comprising:
  a radio frequency (RF) unit, and
  a processor configured to:
    control the RF unit to receive first information indicating a plurality of physical resource block (PRB) pairs, on which an enhanced physical downlink control channel (EPDCCH) search space is configured, and second information indicating whether an enhanced control channel element (ECCE) type for the EPDCCH search space is a localized type or a distributed type; and
    control the RF unit to receive an EPDCCH of the user equipment by decoding EPDCCH candidates on the EPDCCH search space in a subframe,
  wherein each of the EPDCCH candidates is an aggregation of one or more ECCEs, each of which is composed of resource element sets belonging to a same PRB pair among the plurality of PRB pairs, when the ECCE type is the localized type, and
  wherein each of the EPDCCH candidates is an aggregation of one or more ECCEs, each of which is composed of resource element sets belonging to at least two different PRB pairs among the plurality of PRB pairs, when the ECCE type is the distributed type.
6. The user equipment according to claim 5,
  wherein the subframe is divided into a control region and a data region in a time domain, and the EPDCCH search space is on the plurality of PRB pairs within the data region.
7. The user equipment according to claim 6,
  wherein the processor is configured to control the RF unit to further receive a legacy physical downlink control channel (PDCCH) among a plurality of legacy PDCCH candidates within the control region,
  wherein each of the legacy PDCCH candidates is an aggregation of one or more legacy control channel elements (CCEs), each of which corresponds to 9 legacy resource element groups (REGs) among a plurality of legacy REGs within the control region, and
  wherein each of the plurality of legacy REGs consists of 4 consecutive resource elements not used for reference signals in an orthogonal frequency division multiplexing (OFDM) symbol of the control region.
8. The user equipment according to claim 5,
  wherein each of the plurality of PRB pairs are segmented into 16 resource element sets, and wherein each ECCE for the localized and distributed types is composed of 4 resource element sets.

9. A method for transmitting a downlink signal by a base station in a wireless communication system, the method comprising:

transmitting, by the base station, first information indicating a plurality of physical resource block (PRB) pairs, on which an enhanced physical downlink control channel (EPDCCH) search space is configured, and second information indicating whether an enhanced control channel element (ECCE) type for the EPDCCH search space is a localized type or a distributed type; and transmitting, by the base station, an EPDCCH of a user equipment using one of EPDCCH candidates on the EPDCCH search space in a subframe, wherein each of the EPDCCH candidates is an aggregation of one or more ECCEs, each of which is composed of resource element sets belonging to a same PRB pair among the plurality of PRB pairs, when the ECCE type is the localized type, and wherein each of the EPDCCH candidates is an aggregation of one or more ECCEs, each of which is composed of resource element sets belonging to at least two different PRB pairs among the plurality of PRB pairs, when the ECCE type is the distributed type.

10. The method according to claim 9, wherein the subframe is divided into a control region and a data region in a time domain, and the EPDCCH search space is on the plurality of PRB pairs within the data region.

11. The method according to claim 10, further comprising:

transmitting, by the base station, a legacy PDCCH using one of a plurality of legacy PDCCH candidates within the control region, wherein each of the legacy physical downlink control channel (PDCCH) candidates is an aggregation of one or more legacy control channel elements (CCEs), each of which corresponds to 9 legacy resource element groups (REGs) among a plurality of legacy REGs within the control region, and wherein each of the plurality of legacy REGs consists of 4 consecutive resource elements not used for reference signals in an orthogonal frequency division multiplexing (OFDM) symbol of the control region.

12. The method according to claim 9, wherein each of the plurality of PRB pairs are segmented into 16 resource element sets, and wherein each ECCE for the localized and distributed types is composed of 4 resource element sets.

13. A base station for transmitting a downlink signal in a wireless communication system, the base station comprising:

a radio frequency (RF) unit; and a processor configured to:

control the RF unit to transmit first information indicating a plurality of physical resource block (PRB) pairs, on which an enhanced physical downlink control channel (EPDCCH) search space is configured, and second information indicating whether an enhanced control channel element (ECCE) type for the EPDCCH search space is a localized type or a distributed type, and control the RF unit to transmit an EPDCCH of a user equipment using one of EPDCCH candidates on the EPDCCH search space in a subframe, wherein each of the EPDCCH candidates is an aggregation of one or more ECCEs, each of which is composed of resource element sets belonging to a same PRB pair among the plurality of PRB pairs, when the ECCE type is the localized type, and wherein each of the EPDCCH candidates is an aggregation of one or more ECCEs, each of which is composed of resource element sets belonging to at least two different PRB pairs among the plurality of PRB pairs, when the ECCE type is the distributed type.

14. The base station according to claim 13, wherein the subframe is divided into a control region and a data region in a time domain, and the EPDCCH search space is on the plurality of PRB pairs within the data region.

15. The base station according to claim 14, wherein the processor is configured to control the RF unit to further transmit a legacy physical downlink control channel (PDCCH) using one of a plurality of legacy PDCCH candidates within the control region, wherein each of the legacy PDCCH candidates is an aggregation of one or more legacy control channel elements (CCEs), each of which corresponds to 9 legacy resource element groups (REGs) among a plurality of legacy REGs within the control region, and wherein each of the plurality of legacy REGs consists of 4 consecutive resource elements not used for reference signals in an orthogonal frequency division multiplexing (OFDM) symbol of the control region.

16. The base station according to claim 13, wherein each of the plurality of PRB pairs are segmented into 16 resource element sets, and wherein each ECCE for the localized and distributed types is composed of 4 resource element sets.

* * * * *